(12) United States Patent
Derakhshani et al.

(10) Patent No.: US 8,675,925 B2
(45) Date of Patent: Mar. 18, 2014

(54) SPOOF DETECTION FOR BIOMETRIC AUTHENTICATION

(71) Applicant: EyeVerify LLC, Kansas City, KS (US)

(72) Inventors: Reza Derakhshani, Roeland Park, KS (US); Casey Hughlett, Lenexa, KS (US); Jeremy Paben, Prairie Village, KS (US); Joel Teply, Shawnee, KS (US); Toby Rush, Roeland Park, KS (US)

(73) Assignee: Eyeverify LLC, Kansas City, KS (US)

( * ) Notice: Subject to any disclaimer, the term of this patent is extended or adjusted under 35 U.S.C. 154(b) by 0 days.

(21) Appl. No.: 14/059,034

(22) Filed: Oct. 21, 2013

(65) Prior Publication Data

US 2014/0044321 A1 Feb. 13, 2014

Related U.S. Application Data

(63) Continuation of application No. 13/888,059, filed on May 6, 2013, which is a continuation of application No. 13/572,097, filed on Aug. 10, 2012, now Pat. No. 8,437,513.

(51) Int. Cl.
*G06K 9/00* (2006.01)
(52) U.S. Cl.
USPC .......................................... 382/115; 382/117
(58) Field of Classification Search
USPC ................................................ 382/115, 117
See application file for complete search history.

(56) References Cited

U.S. PATENT DOCUMENTS

| | | | |
|---|---|---|---|
| 5,291,560 A | 3/1994 | Daugman | |
| 6,760,467 B1 | 7/2004 | Min et al. | |
| 6,839,151 B1 | 1/2005 | Andree et al. | |
| 7,031,539 B2 | 4/2006 | Tisse et al. | |
| 7,327,860 B2 | 2/2008 | Derakhshani et al. | |

(Continued)

FOREIGN PATENT DOCUMENTS

| | | |
|---|---|---|
| GB | 2471192 | 12/2010 |
| WO | WO01/88857 | 11/2001 |
| WO | WO2008/030127 | 3/2008 |
| WO | WO2008/155447 | 12/2008 |

OTHER PUBLICATIONS

International Search Report and Written Opinion for International Patent Application No. PCT/US2013/043901, filed Jun. 3, 2013; mailed Nov. 15, 2031, 10 pages.
Kollreider et al., "Verifying liveness by multiple experts in face biometrics." Computer Vision and Pattern Recognition Workshops, 2008. CVPR Workshops 2008. IEEE Computer Society Conference on, IEEE, Piscataway, NJ, USA. Jun. 23, 2008, pp. 1-6.

(Continued)

*Primary Examiner* — Utpal Shah
(74) *Attorney, Agent, or Firm* — Goodwin Procter LLP

(57) ABSTRACT

This specification describes technologies relating to biometric authentication based on images of the eye. In general, one aspect of the subject matter described in this specification can be embodied in methods that include obtaining images of a subject including a view of an eye. The methods may further include determining a behavioral metric based on detected movement of the eye as the eye appears in a plurality of the images, determining a spatial metric based on a distance from a sensor to a landmark that appears in a plurality of the images each having a different respective focus distance, and determining a reflectance metric based on detected changes in surface glare or specular reflection patterns on a surface of the eye. The methods may further include determining a score based on the behavioral, spatial, and reflectance metrics and rejecting or accepting the one or more images based on the score.

28 Claims, 10 Drawing Sheets

(56) References Cited

U.S. PATENT DOCUMENTS

| | | | |
|---|---|---|---|
| 7,336,806 | B2 | 2/2008 | Schonberg et al. |
| 7,668,351 | B1 | 2/2010 | Soliz et al. |
| 7,925,058 | B2 * | 4/2011 | Lee et al. ............... 382/117 |
| 8,079,711 | B2 | 12/2011 | Stetson et al. |
| 8,090,246 | B2 * | 1/2012 | Jelinek .................. 396/18 |
| 8,235,529 | B1 | 8/2012 | Raffle et al. |
| 8,251,511 | B2 | 8/2012 | Stetson et al. |
| 8,279,329 | B2 | 10/2012 | Shroff et al. |
| 8,437,513 | B1 | 5/2013 | Derakhshani et al. |
| 8,457,367 | B1 | 6/2013 | Sipe et al. |
| 8,553,948 | B2 * | 10/2013 | Hanna ................... 382/117 |
| 2005/0281440 | A1 | 12/2005 | Pemer |
| 2006/0058682 | A1 | 3/2006 | Miller et al. |
| 2006/0132790 | A1 | 6/2006 | Gutiin |
| 2007/0110285 | A1 | 5/2007 | Hanna et al. |
| 2007/0291277 | A1 | 12/2007 | Everett et al. |
| 2008/0025574 | A1 | 1/2008 | Morikawa et al. |
| 2010/0128117 | A1 | 5/2010 | Dyer |
| 2010/0158319 | A1 | 6/2010 | Jung et al. |
| 2010/0271471 | A1 | 10/2010 | Kawasaki et al. |
| 2011/0033091 | A1 * | 2/2011 | Fujii et al. ............. 382/117 |
| 2011/0058712 | A1 | 3/2011 | Sanchez Ramos |
| 2012/0163678 | A1 | 6/2012 | Du et al. |
| 2012/0300990 | A1 | 11/2012 | Hanna et al. |

OTHER PUBLICATIONS

Toth et al., "Liveness Detection: Iris" In: Stan Z. Li: "Encyclopedia of Biometrics," Jan. 2009, vol. 2, pp. 931-938.
Bowyer, K.W., et al., "A Survey of Iris Biometrics Research: 2008-2010", Handbook of Iris Recognition, editors, Springer, 2012, 40 pages.
Bowyer, "Image Understanding for Iris Biometrics: A Survey," Computer Vision and Image Understanding, vol. 110, No. 2, May 2008, pp. 281-307.
Cesar Jr. et al., "Neurcal Cell Classification by Wavelets and Multiscale Curvature", Biological Cybernetics, vol. 79, 1998, pp. 347-360.
Clausi, "Designing Gabor Filters for Optimal Texture Separability," Pattern Recognition, vol. 33, 2000, pp. 1835-1849.
Chen et al., "A Texture-Based Method for Classifying Cracked Concrete Surfaces From Digital Images Using Neural Networks", Proceedings of International Joint Conference on Neural Networks, IEEE, San Jose, CA, Jul. 31-Aug. 5, 2011, pp. 2632-2637.
Choras, "Ocular Biometrics—Automatic Feature Extraction From Eye Images", Recent Researches in Telecommunications, Informatics, Electronics and Signal Processing, ISBN: 978-1-61804-005-3, 2011, pp. 179-183.
Costa et al., Shape Analysis and Classification, Theory and Practice, "Shape Recognition and Classification", ISBN 0-8493-3493-4, 2001, pp. 608-615.
Crihalmeanu et al., "Enhancement and Registration Schemes for Matching Conjunctival Vasculature", Proc. of the $3^{rd}$ IAPR/IEEE International Conference on Biometrics (ICB), Alghero, Italy, Jun. 2009, LNCS 5558, 2009, pp. 1247-1256.
Crihalmeanu et al., "Multispectral Scleral Patterns for Ocular Biometric Recognition", Pattern Recognition Letters, doi: 10/1016, j.patrec, 2011.
Derakhshani et al., "A New Biometric Modality Based on Conjunctival Vasculature", Smart Systems Engineering: Infra-Structure Systems Engineering, Bio-Informatics and Computational Biology and Evolutionary Computation, vol. 16, Proceedings of the Artificial Neural Networks in Engineering Conference, Nov. 6-8, 2006, pp. 497-504.
Derakhshani et al., "Computational Methods for Objective Assessment of Conjunctival Vascularity", Proceedings of the 2012 IEEE Engineering in Medicine and Biology Conference, San Diego, CA (to appear).
Derakhshani et al., "A Texture-Based Neural Network Classifier for Biometric Identification Using Ocular Surface Vasculature," Proceedings of International Joint Conference on Neural Networks, Aug. 12-17, 2007.
Derakhshani et al., "A Vessel Tracing Algorithm for Human Conjunctival Vasculature," Abstract in Proceedings of the Kansas City Life Sciences Institute Research Day Conference, Kansas City Convention Center, Mar. 2006, p. 150.
Gottemukkula et al., "A Texture-Based Method for Identification of Retinal Vasculature", IEEE, 978-1-4577-1376, Jul. 2011, pp. 434-439.
Grigorescu et al., "Comparison of Texture Features Based on Gabor Filters," IEEE Transactions on Image Processing, vol. 11, No. 10, Oct. 2002, pp. 1160-1167.
http://appbank.us/healthcare/pulse-phone-put-your-finger-against-the-camera-to-check-your-pulse-check-your-pulse-every-day-and-keep-control-of-your-health, accessed Aug. 8, 2012.
Kalka, K.D., et al., "Estimating and Fusing Quality Factors for Iris Biometric Images", IEEE Transactions on Systems, Man, and Cybernetics—Part A: Systems and Humans, May 2010, vol. 40, No. 3, pp. 509-524.
Kirbas et al., "Vessel Extraction Techniques and Algorithms: A Survey," Proceedings of the Third IEEE Symposium on Bioinformatics and Bioengineering, Computer Society, 2003, 8 pages.
Li, "Automated Feature Extraction in Color Retinal Images by a Model Based Approach", IEEE Transactions on Biomedical Engineering, vol. 51, No. 2, Feb. 2004, pp. 246-254.
Liu et al., "Finger Vein Recognition With Manifold Learning," Journal of Network and Computer Applications, vol. 33, 2010, pp. 275-282.
Liu et al., "Gabor Feature Based Classification Using the Enhanced Fisher Linear Discriminant Model for Face Recognition," IEEE Transactions on Image Processing vol. 11, No. 4, Apr. 2002, pp. 467-476.
Owen et al., "Optimal Green (Red-free) Digital Imaging of Conjunctival Vasculature," Opthalmic Physiol. Opt., vol. 22, May 2002, pp. 234-243.
Proenca, "Quality Assessment of Degraded Iris Images Acquired in the Visible Wavelength," IEEE Transactions on Information Forensics and Security, vol. 6, No. 1, Mar. 2011, pp. 82-95.
Randen et al., "Filtering for Texture Classification: A Comparative Study," IEEE Transactions on Pattern Analysis and Machine Intelligence, vol. 21, No. 4, Apr. 1999, pp. 291-310.
Saad et al., "Model-Based Blind Image Quality Assessment Using Natural DCT Statistics," IEEE Transactions on Image Processing, vol. X, No. X, Dec. 2010.
Schwartz, "Sophisticated Temporal Pattern Recognition in Retinal Ganglion Cells", J. Neurophysiol. 99, Feb. 13, 2008, pp. 1787-1798.
Sun et al., "Improving Iris Recognition Accuracy Via Cascaded Classifiers," IEEE Transactions on Systems, Man, and Cybernetics—Part C: Applications and Reviews, vol. 35, No. 3, Aug. 2005, pp. 435-441.
Tankasala et al., "Biometric Recognition of Conjunctival Vasculature Using GLCM Features", International Conference on Image Information Processing, IEEE 978-1-61284-861, Jul. 2011.
Tankasala et al., "Classification of Conjunctival Vaculature Using GLCM Features", Proceedings of the 2011 IEEE International Conference no Image Information Processing, Waknaghat, India.
Tankasala et al., "Visible Light, Bi-Modal Ocular Biometrics", Proceedings of the 2012 International Conference on Communication Computing and Security (ICCCS), India (to appear).
Wu et al., "Extraction and Digitization Method of Blood Vessel in Scleraconjunctiva Image," International Journal of Computer Science and Network Security, vol. 11, No. 7, Jul. 2011, pp. 113-118.
Zhou et al., "A Comprehensive Sclera Image Quality Measure", $11^{th}$ Int'l. Conf. Control, Automation, Robotics and Vision, Singapore, Dec. 7-10, 2010, pp. 638-643.
Zhou et al., "A New Human Identification Method: Sclera Recognition", IEEE Transactions on Systems, Man, and Cybernetics—Part A: Systems and Humans, vol. 42, No. 3, May 2012, pp. 571-583.
Zhou et al., "Multi-angle Sclera Recognition System", 978-1-4244-9900, IEEE, Jul. 2011.
International Search Report and Written Opinion dated Nov. 15, 2013 for International Application No. PCT/US2013/043905, filed Jun. 3, 2013; 10 pages.

* cited by examiner

SPOOF DETECTION FOR BIOMETRIC AUTHENTICATION

CROSS REFERENCE TO RELATED APPLICATION

This application is a continuation application of, and claims priority to, pending U.S. patent application Ser. No. 13/888,059, filed on May 6, 2013, entitled "Spoof Detection for Biometric Authentication", which is a continuation application of, and claims priority to, patented U.S. patent application Ser. No. 13/572,097, filed on Aug. 10, 2012, entitled "Spoof Detection for Biometric Authentication". The disclosures of the foregoing applications are incorporated herein by reference in their entirety.

TECHNICAL FIELD

The present disclosure relates to biometric authentication based on images of the eye.

BACKGROUND

It is often desirable to restrict access to property or resources to particular individuals. Biometric systems may be used to authenticate the identity of an individual to either grant or deny access to a resource. For example, iris scanners may be used by a biometric security system to identify an individual based on unique structures in the individual's iris.

SUMMARY

This specification describes technologies relating to biometric authentication based on images of the eye. In general, one aspect of the subject matter described in this specification can be embodied in a method that includes obtaining two or more images of a subject including a view of an eye, wherein the images collectively include a plurality of focus distances. The method may further include determining a behavioral metric based on, at least, detected movement of the eye as the eye appears in a plurality of the images. The behavioral metric may be a measure of deviation of detected movement and timing from expected movement of the eye. The method may further include determining a spatial metric based on, at least, a distance from a sensor to a landmark that appears in a plurality of the images each having a different respective focus distance. The method may further include determining a reflectance metric based on, at least, detected changes in surface glare or specular reflection patterns on a surface of the eye as the eye appears in a plurality of the images, wherein the reflectance metric is a measure of changes in glare or specular reflection patches on the surface of the eye. The method may further include determining a score based on, at least, the behavioral, spatial, and reflectance metrics. The method may further include rejecting or accepting the one or more images based on the score.

In general, one aspect of the subject matter described in this specification can be embodied in a system that includes a sensor configured to capture two or more images of a subject including a view of an eye, wherein the images collectively include a plurality of focus distances. The system may further include an illumination element provide photic stimuli in synchronization with the capture of one or more images by the sensor. The system may further include a means for determining a behavioral metric based on, at least, detected movement of the eye as the eye appears in a plurality of the images. The behavioral metric is a measure of deviation of detected movement and timing from expected movement of the eye. The system may further include a module configured to determine a spatial metric based on, at least, a distance from a sensor to a landmark that appears in a plurality of the images each having a different respective focus distance. The system may further include a module configured to determine a reflectance metric based on, at least, detected changes in surface glare or specular reflection patterns on a surface of the eye as the eye appears in a plurality of the images, wherein the reflectance metric is a measure of changes in glare or specular reflection patches on the surface of the eye. The system may further include a module configured to determine a score based on, at least, the behavioral, spatial, and reflectance metrics. The system may further include an interface configured to reject or accept the one or more images based on the score.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including obtaining two or more images of a subject including a view of an eye, wherein the images collectively include a plurality of focus distances. The operations may further include determining a behavioral metric based on, at least, detected movement of the eye as the eye appears in a plurality of the images. The behavioral metric may be a measure of deviation of detected movement and timing from expected movement of the eye. The operations may further include determining a spatial metric based on, at least, a distance from a sensor to a landmark that appears in a plurality of the images each having a different respective focus distance. The operations may further include determining a reflectance metric based on, at least, detected changes in surface glare or specular reflection patterns on a surface of the eye as the eye appears in a plurality of the images, wherein the reflectance metric is a measure of changes in glare or specular reflection patches on the surface of the eye. The operations may further include determining a score based on, at least, the behavioral, spatial, and reflectance metrics. The operations may further include rejecting or accepting the one or more images based on the score.

In general, one aspect of the subject matter described in this specification can be embodied in a non-transient computer readable media storing software including instructions executable by a processing device that upon such execution cause the processing device to perform operations that include obtaining two or more images of a subject including a view of an eye, wherein the images collectively include a plurality of focus distances. The operations may further include determining a behavioral metric based on, at least, detected movement of the eye as the eye appears in a plurality of the images. The behavioral metric may be a measure of deviation of detected movement and timing from expected movement of the eye. The operations may further include determining a spatial metric based on, at least, a distance from a sensor to a landmark that appears in a plurality of the images each having a different respective focus distance. The operations may further include determining a reflectance metric based on, at least, detected changes in surface glare or specular reflection patterns on a surface of the eye as the eye appears in a plurality of the images, wherein the reflectance metric is a measure of changes in glare or specular reflection patches on the surface of the eye. The operations may further include determining a score based on, at least, the behavioral, spatial, and reflectance metrics. The operations may further include rejecting or accepting the one or more images based on the score.

These and other embodiments can each optionally include one or more of the following features. Determining the behavioral metric may include determining an onset, duration, velocity, or acceleration of pupil constriction in response to photic stimuli. The photic stimuli may include a flash pulse. The photic stimuli may include a change in the intensity of light output by a display. The determining the behavioral metric may include determining an onset, duration, or acceleration of gaze transition in response to external stimuli. The external stimuli may include prompts for instructing a user to direct gaze. The external stimuli may include an object depicted in a display that moves within the display. The spatial metric may be a measure of deviation of the subject from a two-dimensional plane. The spatial metric may be a measure of deviation of the subject from an expected three-dimensional shape. Determining the spatial metric may include determining parallax of two or more landmarks that appear in a plurality of the images. Half-tones may be detected in an image captured using reduced dynamic range and the images may be rejected based at least in part on the half-tones. Determining the behavioral metric may include detecting blood flow of the eye as the eye appears in a plurality of the images. Determining the score may include using a trained function approximator to determine the score. The landmark may be a portion of a face depicted in the images. Determining the reflectance metric may include pulsing a flash to illuminate the subject while one or more of the images are being captured, detecting the appearance of glare on the eye from the flash in the images, and measuring the time difference between the pulsing of the flash and the appearance of a corresponding glare on the eye in the images. Determining the reflectance metric may include pulsing a flash to illuminate the subject while one or more of the images are being captured and detecting fine three dimensional texture of a white of the eye by measuring uniformity of a pattern of glare on the eye from the flash in the images. A sensor setting that controls focus may be adjusted to a plurality of different settings during capture of two or more of the images. The images captured with different focus settings may be compared to determine whether these images reflect their respective focus settings. A sensor setting that controls exposure may be adjusted to a plurality of different settings during capture of two or more of the images. The images captured with different exposure settings may be compared to determine whether these images reflect their respective exposure settings. A sensor setting that controls white balance may be adjusted to a plurality of different settings during capture of two or more of the images. The images captured with different white balance settings may be compared to determine whether these images reflect their respective white balance settings.

Particular embodiments of the invention can be implemented to realize none, one or more of the following advantages. Some implementations may provide security by reliably authenticating individuals. Some implementations may prevent spoofing of an eye biometric based authentication system using objects that are not a living human eye.

The details of one or more embodiments of the invention are set forth in the accompanying drawings and the description below. Other features, aspects, and advantages of the invention will become apparent from the description, the drawings, and the claims.

DETAILED DESCRIPTION

Distinctive features of an individual's visible vasculature in the whites of the eyes may be used to identify or authenticate the individual. For example, images of the white of a user's eye can be obtained and analyzed to compare features of the eye to reference record in order to authenticate the user and grant or deny the user access to a resource. Adversaries or intruders could attempt spoof a security system using such an authentication method by presenting something other than a live eye (e.g., a picture of an authorized user's face or a plastic model of an authorized user's eye) to the security system's light sensor. Some spoof attempts may be frustrated by configuring a security system to analyze the obtained images to discriminate images of live eyes from images of props.

One or more liveness metrics can be calculated that reflect properties a live eye is expected to exhibit that may not be exhibited by certain spoof attempts. For example, stimuli can be applied to a user during the image acquisition process and the response of an eye depicted in the images may be quantified with a metric compared to an expected response of a live eye to those stimuli. In some implementations, the obtained images can be checked at a plurality of focus distances to determine if the eye depicted in the images is three dimensional (e.g., does it have landmarks that appear to be positioned at distances from the sensor that deviated from a single plane). In some implementations, a metric related to the reflectance of the eye may be determined. A live eye has unique reflectance properties caused by its three dimensional shape and its fine surface texture and moisture that may not be exhibited by many spoof attack props. For example, a flash device may be used to illuminate the subject during a portion of the image acquisition process and the timing and quality of the reflection of the flash pulse on the subject's eye may analyzed to determine if it is indeed a live eyeball being imaged in real time.

In some implementations, a plurality of liveness metrics may be combined to determine a liveness score or decision that reflects the likelihood that the images depict a live eye, as opposed to, for example, an image of model or a two-dimensional picture of an eye. For example, a trained function approximator (e.g., a neural network) can be used to determine, based on a plurality of liveness metrics, a liveness score. The images obtained can then be accepted or rejected based on the liveness score. In some implementations, a spoof attempt may be reported when the liveness score indicates that the images do not depict a live eye.

Figure 1:
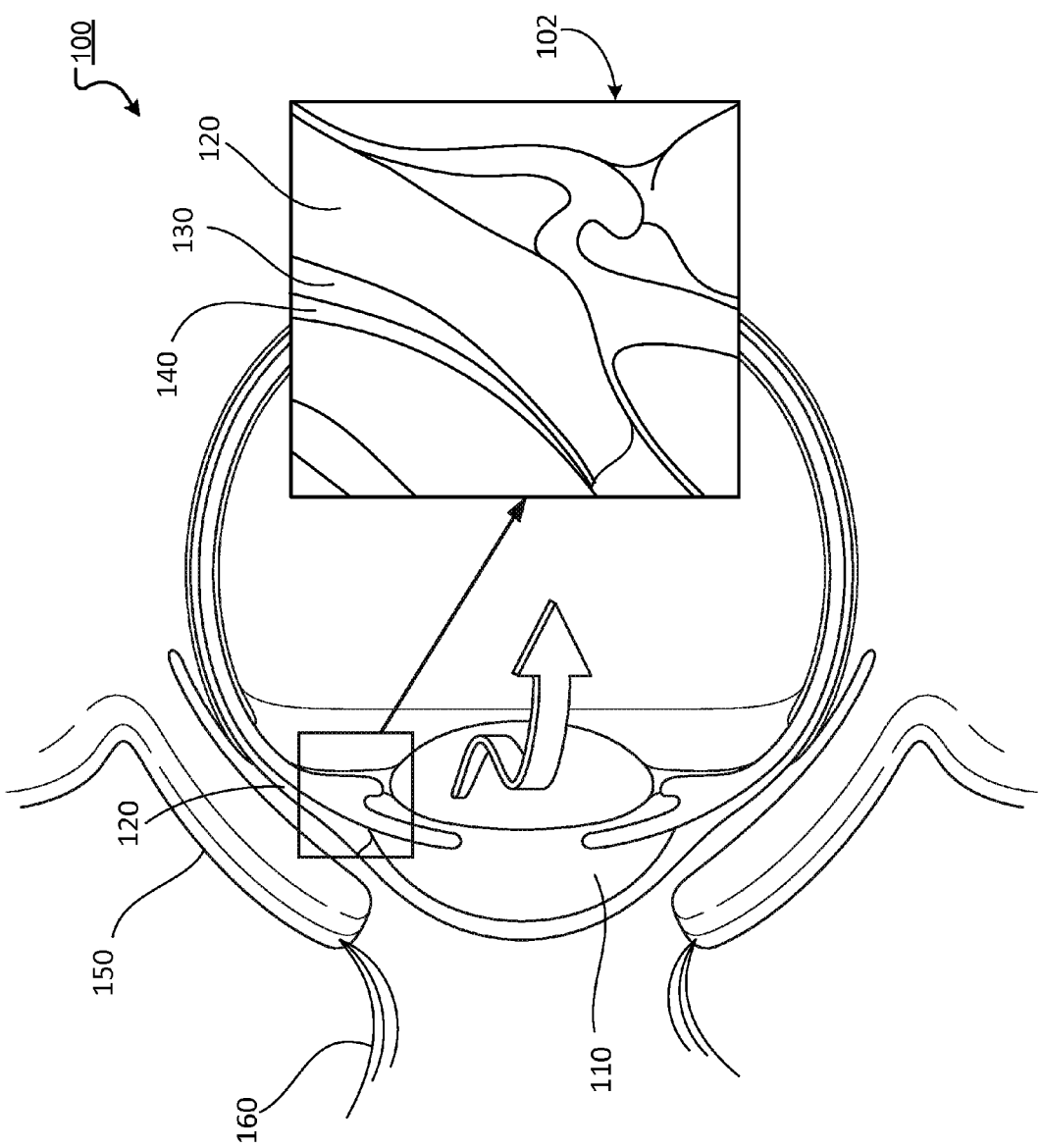
FIG. 1 is a diagram of the anatomy of a human eye.

FIG. 1 is a diagram of the anatomy of a human eye 100. The diagram is a cross-section of the eye with a blowup 102 of the anatomy near the corneal limbus boundary of the eye that separates the colored iris 110 from the surrounding white of the eye. The white of the eye includes a complex vascular structure which is not only readily visible and scannable from outside of the eye, but in addition that vascular structure is unique and varies between individuals. Thus, these vascular structures of the white of the eye, mostly due to vasculature of conjunctiva and episclera, can be scanned and advantageously used as a biometric. This biometric can be used to authenticate a particular individual, or, identify an unknown individual.

The white of the eye has a number of layers. The sclera 120 is an opaque, fibrous, protective, layer of the eye containing collagen and elastic fiber. The sclera 120 is covered by the episclera 130, which has a particularly large number of blood vessels and veins that that run through and over it. The episclera 130 is covered by the bulbar conjunctiva 140, which is a thin clear membrane that interfaces with the eyelid 150 or the environment when the eyelid is opened. Blood vessels and veins run through all of these layers of the white of the eye and can be detected in images of the eye. The eye also includes eyelashes 160 that may sometimes obscure portions of the white of the eye in an image.

Figure 2:
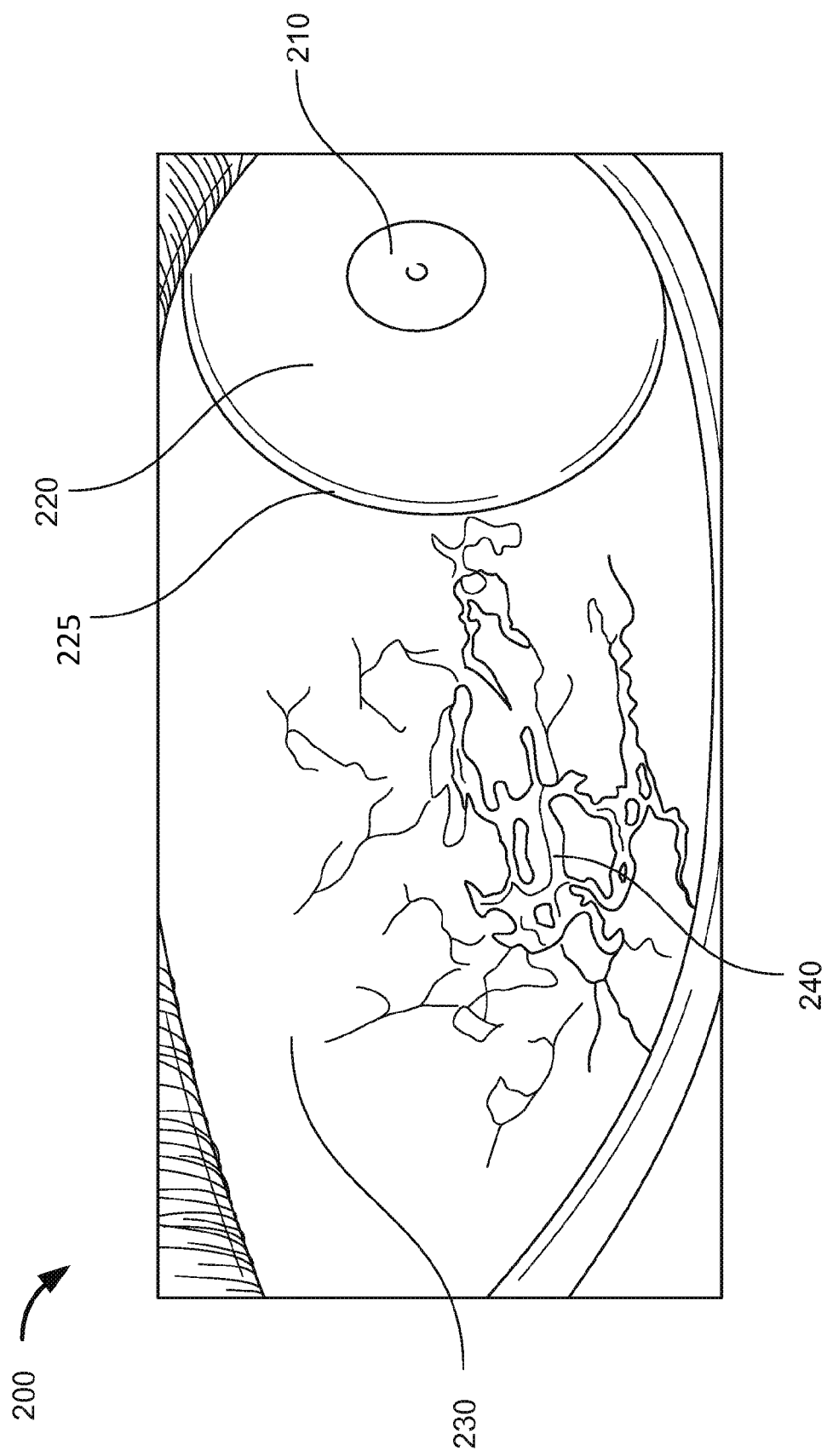
FIG. 2 is a diagram of an example image including portions showing vasculature of the white of an eye.

FIG. 2 is a diagram of an example image 200 including portions showing vasculature of the white of an eye. Such an image 200 may be captured with a sensor (e.g., a camera) that is integrated into a computing device such as, for example, a smart phone, a tablet computer, a television, a laptop computer, or a personal computer. For example, a user may be prompted through a display or audio prompt to look to the left while the image is captured, thus exposing a larger area of the white of the eye to the right of the iris to the view of the sensor. Similarly, a user may be prompted to look right, up, down, straight, etc. while an image is captured. The example image includes a view of an iris 220 with a pupil 210 at its center. The iris 220 extends to the corneal limbus boundary 225 of the eye. The white 230 of the eye is external to a corneal limbus boundary 225 of the eye. An extensive vasculature 240 of the white of the eye is visible in the image 100. This vasculature 240 may be distinctive for an individual. In some implementations, distinctive features of the vasculature 240 may be used as a basis for identifying, verifying, or authenticating an individual user.

Figure 3:
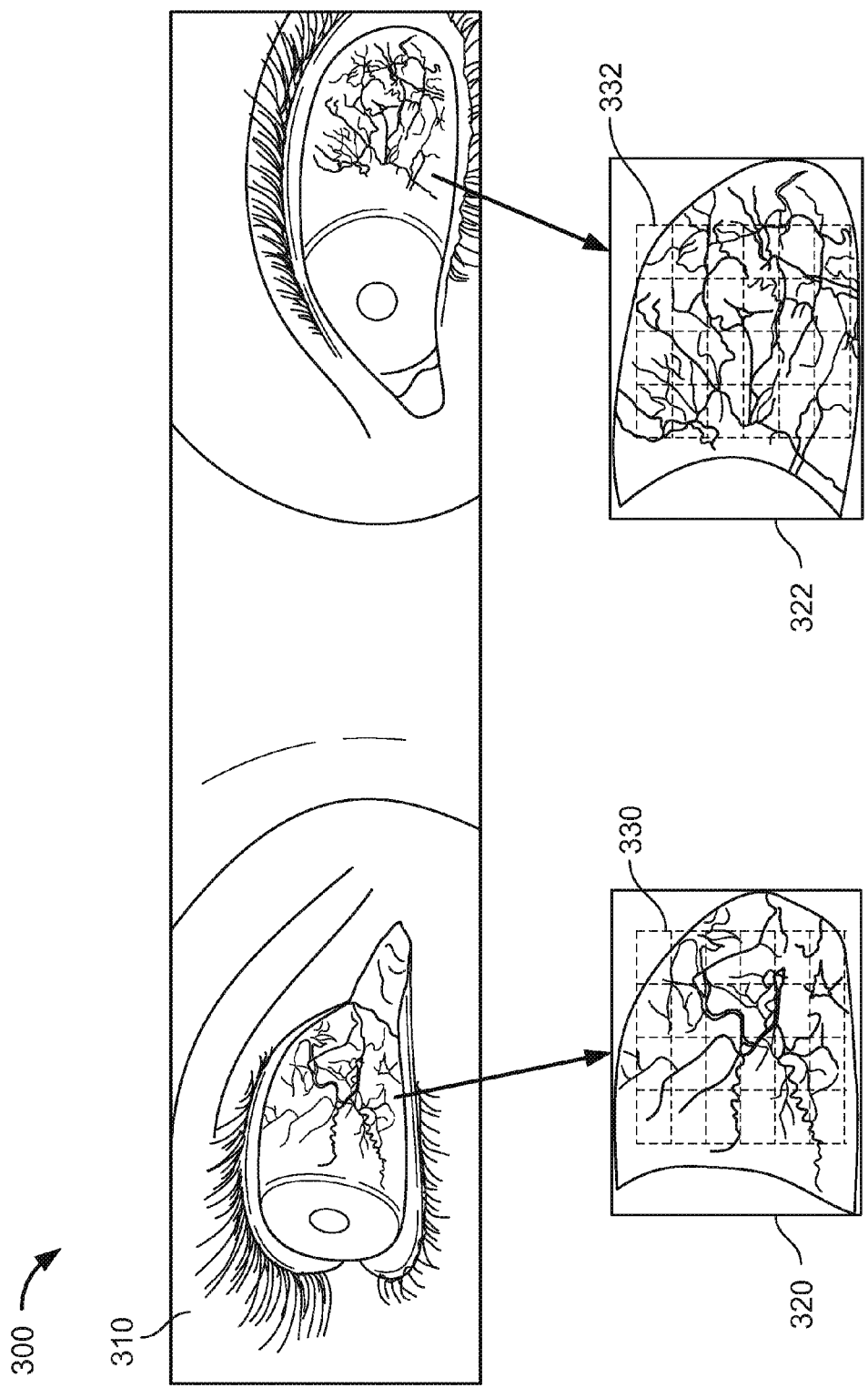
FIG. 3 is a diagram of an example image that is segmented for analysis.

FIG. 3 is a diagram of an example image 300, including portions showing vasculature of the whites of two eyes, that is segmented for analysis. A captured image 310 may be obtained in a variety of ways. The captured image 310 may be preprocessed and segmented to isolate regions of interest within the image and enhance the view of vasculature in the whites of the eyes. For example, the regions of interest may be tiled portions that form grids covering some or all the whites of the eyes. A portion 320 of the corresponding to the white of the right eye left of the iris may be isolated, for example, by identifying the corneal limbus boundary and the edges of the eyelids. Similarly, a portion 322 corresponding to the white of the left eye left of the iris may be isolated. Preprocessing may be used to enhance the view of the vasculature in this region, for example, by selecting a component color from the image data that maximizes the contrast between the vasculature and the surrounding white portions of the whites of the eyes. In some implementations, these portions 320, 322 of the image may be further segmented into tiles forming grids 330, 332 that divide an exposed surface area of the whites of the eyes into smaller regions for analysis purposes. Features of the vasculature in these regions of interest may be used for identification, verification, or authentication of an individual.

Figure 4:
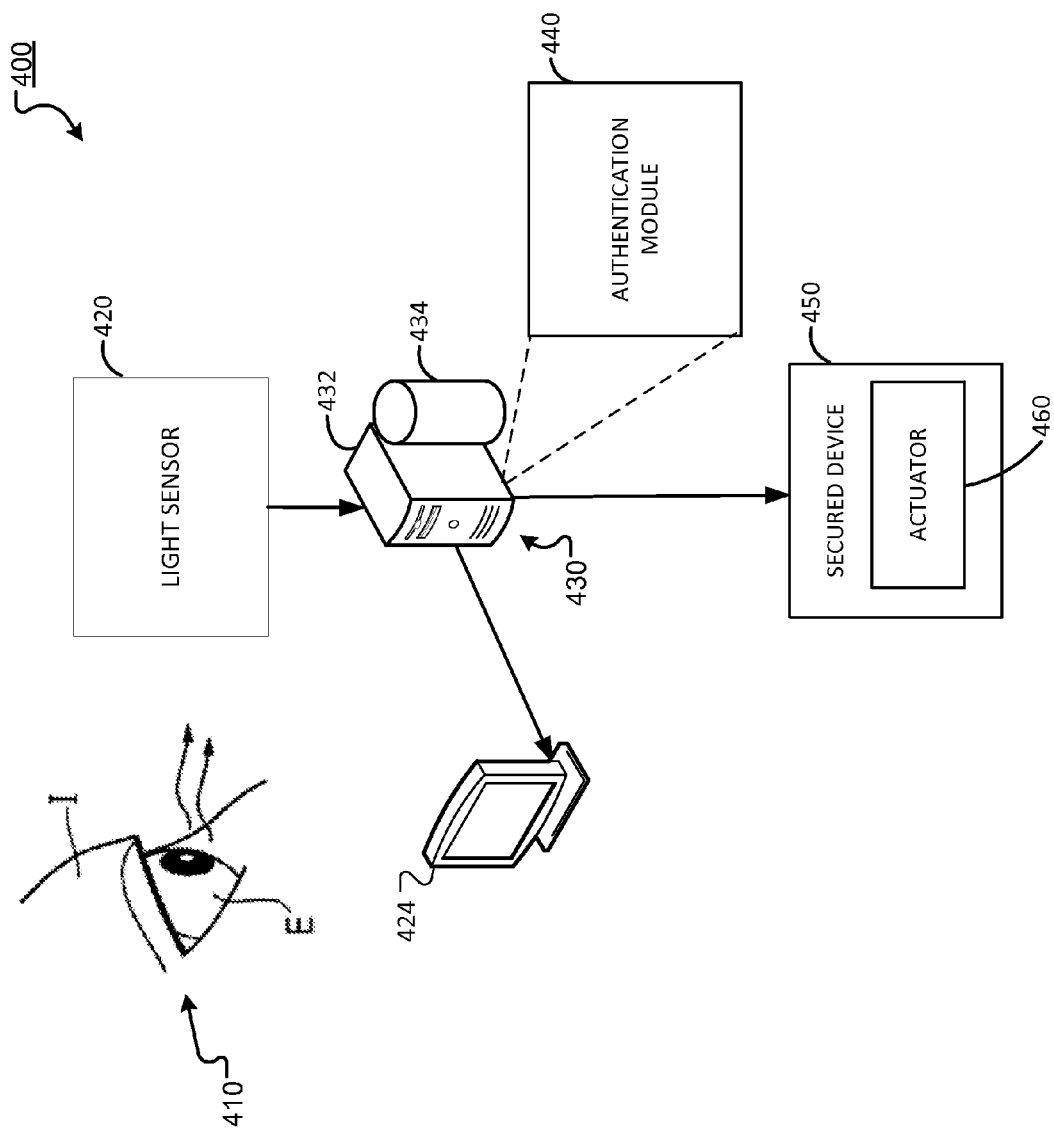
FIG. 4 is a block diagram of example security system that is configured to authenticate an individual based in part on one or more images of the white of an eye.

FIG. 4 is a block diagram of example security system 400 that is configured to authenticate an individual based in part on one or more images of the white of an eye 410. A user of the security system 400 may present their eye 410 to a light sensor 420. In this manner one or more images of the white of the eye 410 may be captured. A digital camera, a three-dimensional (3D) camera, and a light field sensor are examples of light sensors that may be employed. The light sensor 420 may employ a variety of technologies, e.g., digital charge-coupled devices (CCD) or complementary metal-oxide-semiconductors (CMOS). In some implementations, the user may be prompted via messages shown on display 424 to make certain poses to expose portions of the white of the eye 410 and facilitate image acquisition. For example, the user may be prompted to direct their gaze in order to roll the iris of their eye 410 left, right, up, up-left, and roll up-right. In some implementations, not shown, the user may be prompted to assume poses though messages played through a speaker, through indicator lights (e.g. LEDs), or not prompted at all.

In some implementations, the sensor 420 can be configured to detect when the eye 410 has been properly positioned in the field of view of the sensor. Alternatively, software or firmware implemented on a computing device 430 can analyze one or more images produced by the light sensor 420 to determine whether the eye 410 has been properly positioned. In some implementations, the user may manually indicate when the eye 410 is properly positioned through a user interface (e.g., button, keyboard, keypad, touchpad, or touch screen).

An authentication module 440 implemented on the computing device 430 may obtain one or more images of the white of the eye through the light sensor 420. In some implementations, the computing device 430 is integrated with or electrically coupled to the light sensor 420. In some implementations, the computing device 430 may communicate with the light sensor 420 through a wireless interface (e.g., an antenna).

The authentication module 440 processes images obtained through the light sensor 420 to control access to a secured device 450. For example, the authentication module 440 may implement authentication processes described in relation to FIG. 6. In some implementations, the secured device 450 may include an actuator 460 (e.g., a locking mechanism) that affects the access control instructions from the authentication module 440.

The computing device may be integrated with or interface with the secured device 450 in a variety of ways. For example, the secured device 450 may be an automobile, the light sensor 420 may be a camera integrated in the steering wheel or dashboard of the automobile, and the computing device 430 may be integrated in the automobile and electrically connected to the camera and an ignition locking system that serves as the security actuator 460. A user may present views of the whites of their eye to the camera in order to be authenticated as an authorized driver of the automobile and start the engine.

In some implementations, the secured device 450 may be a real estate lock box, the light sensor 420 may be a camera integrated with the user's mobile device (e.g., a smartphone or tablet device), and the processing of the authentication module 440 may be performed in part by the user's mobile device and in part by a computing device integrated with the lock box that controls a power locking mechanism. The two computing devices may communicate through a wireless interface. For example, the user (e.g., a realtor giving a showing of a property) may use the camera on their mobile device to obtain one or more images and submit data based on the images to the lock box in order to be authenticated as authorized user and granted access to keys stored in the lock box.

In some implementations, the secured device 450 is a gate or door that controls access to a property. The light sensor 420 may be integrated in the door or gate or positioned on a wall or fence near the door or gate. The computing device 430 may be positioned nearby and may communicate through a wireless interface with the light sensor 420 and a power locking mechanism in the door or gate that serves as an actuator 460. In some implementations, the secured device 450 may be a rifle and the light sensor 420 may be integrated with a scope attached to the rifle. The computing device 430 may be integrated in the butt of the rifle and may electronically connect to the light sensor 420 and a trigger or hammer locking mechanism that serves as an actuator 460. In some implementations, the secured device 450 may be a piece of rental equipment (e.g., a bicycle).

The computing device 430 may include a processing device 432 (e.g., as described in relation to FIG. 9) and a machine-readable repository, or database 434. In some implementations, the machine-readable repository may include flash memory. The machine-readable repository 434 may be used to store one or more reference records. A reference record may include data derived from one or more images of the white of an eye for a registered our authorized user of the secured device 450. In some implementations, the reference record includes complete reference images. In some implementations the reference record includes features extracted from the reference images. In some implementations the reference record includes encrypted features extracted from the reference images. In some implementations the reference record includes identification keys encrypted by features extracted from the reference images. To create a reference record for a new user and enrollment or registration process may be carried out. An enrollment process may include the capture of one or more reference images of the white of a new registered user's eye. In some implementations, the enrollment process may be performed using the light sensor 420 and processing device 430 of authentication system 400.

Figure 5:
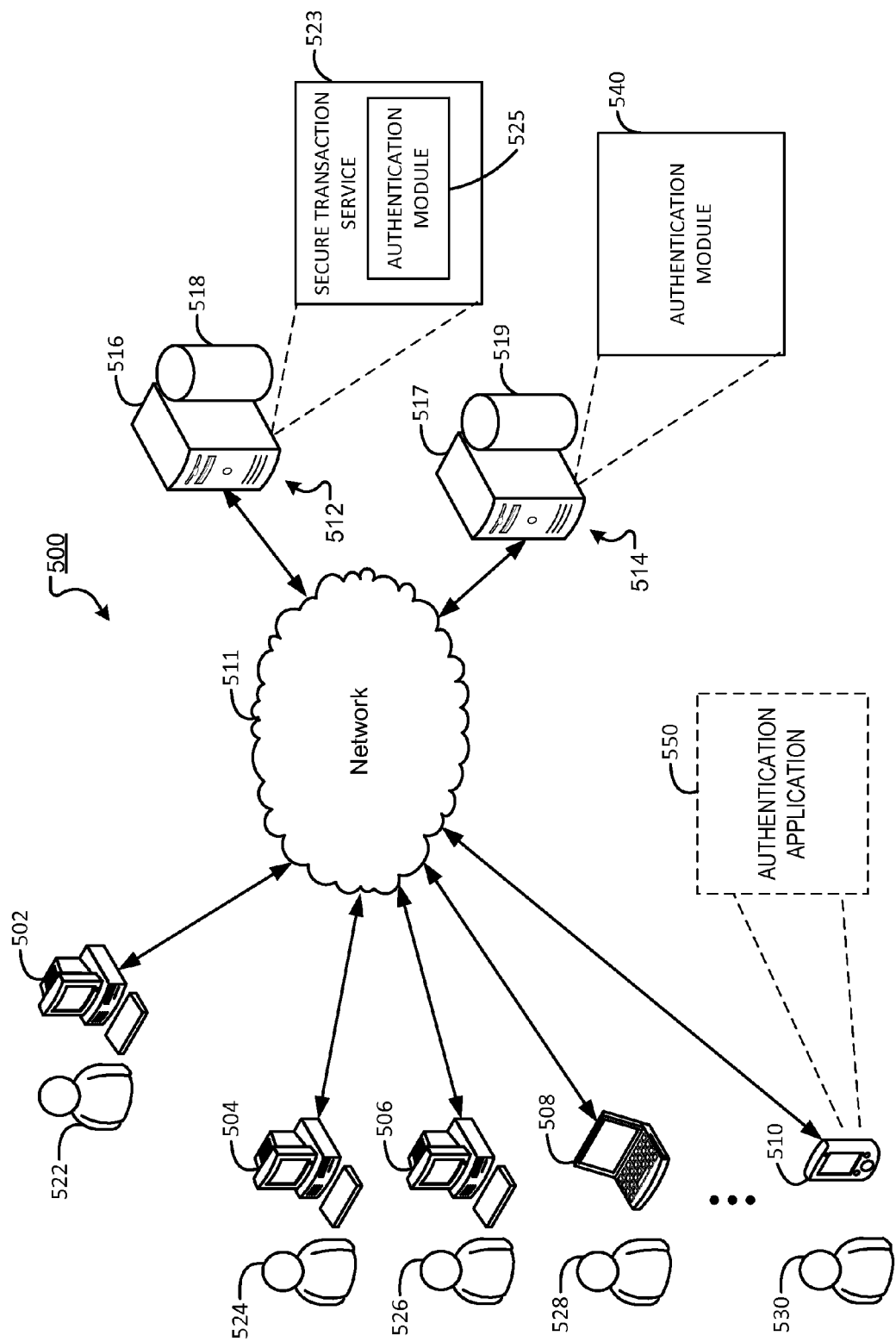
FIG. 5 is a block diagram of an example online environment.

FIG. 5 is a block diagram showing an example of a network environment 500 on which the techniques described herein may be implemented. Network environment 500 includes computing devices 502, 504, 506, 508, 510 that are configured to communicate with a first server system 512 and/or a second server system 514 over a network 511. Computing devices 502, 504, 506, 508, 510 have respective users 522, 524, 526, 528, 530 associated therewith. The first and second server systems 512, 514 each include a computing device 516, 517 and a machine-readable repository, or database 518, 519. Example environment 500 may include many thousands of Web sites, computing devices and servers, which are not shown.

Network 511 may include a large computer network, examples of which include a local area network (LAN), wide area network (WAN), the Internet, a cellular network, or a combination thereof connecting a number of mobile computing devices, fixed computing devices, and server systems. The network(s) included in network 511 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 502, 504, 506, 508, 510 enable respective users 522, 524, 526, 528, 530 to access and to view documents, e.g., web pages included in web sites. For example, user 522 of computing device 502 may view a web page using a web browser. The web page may be provided to computing device 502 by server system 512, server system 514 or another server system (not shown).

In example environment 500, computing devices 502, 504, 506 are illustrated as desktop-type computing devices, computing device 508 is illustrated as a laptop-type computing device 508, and computing device 510 is illustrated as a mobile computing device. It is noted, however, that computing devices 502, 504, 506, 508, 510 may include, e.g., a desktop computer, a laptop computer, a handheld computer, a television with one or more processors embedded therein and/or coupled thereto, a tablet computing device, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 502, 504, 506, 508, 510 can interact with a secure transaction service 523 hosted, e.g., by the server system 512, by authenticating themselves and issuing instructions or orders through the network 511. The secure transactions may include, e.g., e-commerce purchases, financial transactions (e.g., online banking transactions, credit or bank card transactions, loyalty reward points redemptions), or online voting. The secured transaction service may include an authentication module 525 that coordinates authentication of users from the secured server's side of the interaction. In some implementations, authentication module 525 may receive image data from a user device (e.g., computing devices 502, 504, 506, 508, 510) that includes one or more images of the eye of a user (e.g., users 522, 524, 526, 528, 530). The authentication module may then process the image data to authenticate the user by determining if the image data matches a reference record for a recognized user identity that has been previously created based on image data collected during an enrollment session.

In some implementations, a user who has submitted a request for service may be redirected to an authentication module 540 that runs on separate server system 514. Authentication module 540 may maintain reference records for registered or enrolled users of the secure transaction service 523 and may also include reference records for users of other secure transaction services. Authentication module 540 can establish secure sessions with various secure transaction services (e.g., secure transaction service 523) using encrypted network communications (e.g., using a public key encryption protocol) to indicate to the secure transaction service whether the user has been authenticated as a registered or enrolled user. Much like authentication module 525, authentication module 540 may receive image data from the requesting user's computing device (e.g., computing devices 502, 504, 506, 508, 510) and may process the image data to authenticate the user. In some implementations, the authentication module may determine liveness scores for images received from a user and may accept or reject the images based on the liveness scores. When an image is rejected as a spoof attempt presenting something other than a live eye, the authentication module 540 may send network communication messages to report the spoof attempt to the secure transaction service 523 or a relevant authority.

Figure 9:
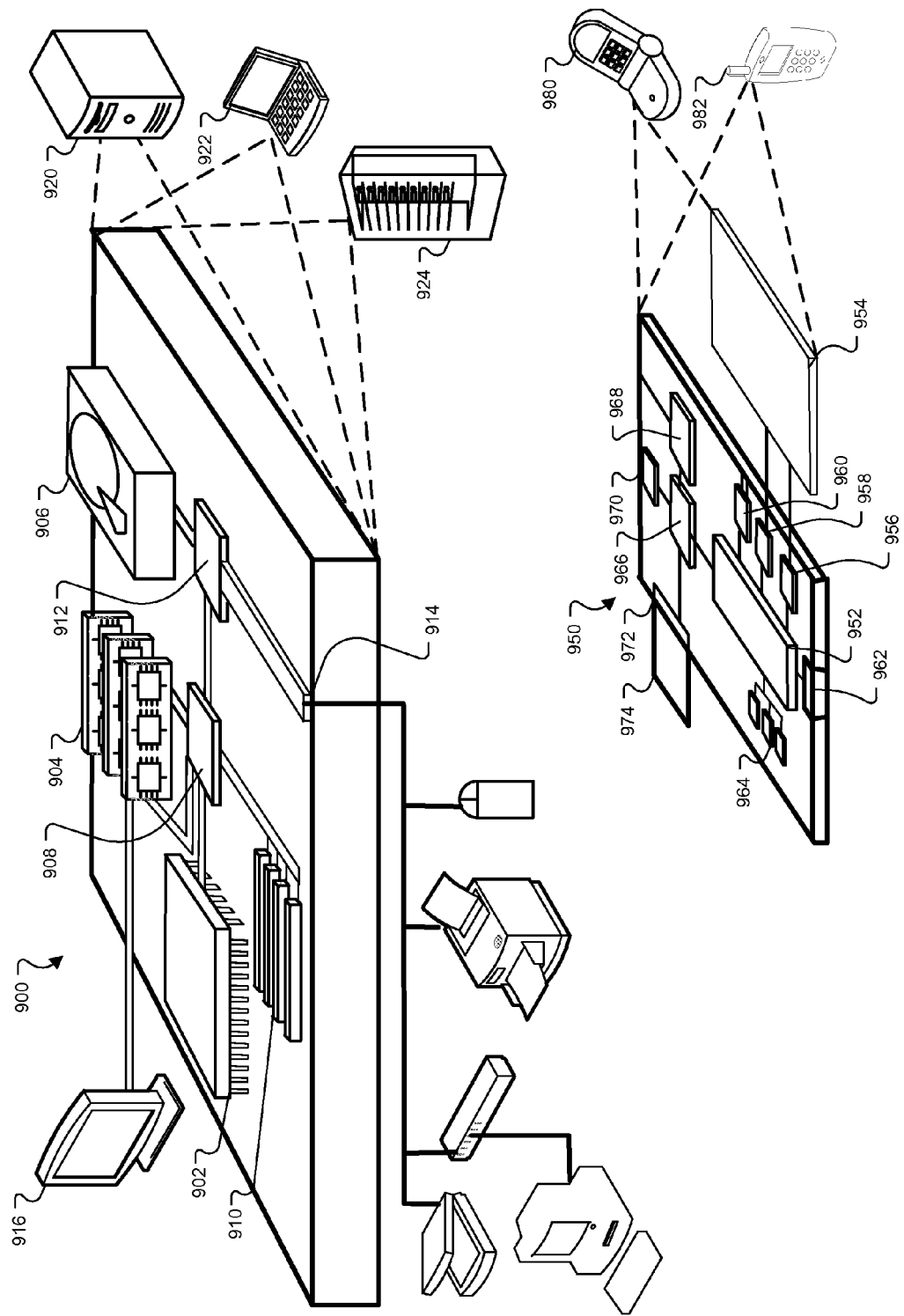
FIG. 9 shows an example of a computer device and a mobile computer device that can be used to implement the techniques described here.

The authentication module 540 may be implemented as software, hardware or a combination of software and hardware that is executed on a processing apparatus, such as one or more computing devices (e.g., a computer system as illustrated in FIG. 9).

A user device (e.g., computing device 510) may include an authentication application 550. The authentication application 550 may facilitate the authentication of the user as a registered or enrolled user identity for the purpose of accessing secured services (e.g., secure transaction service 523) through a network 511. For example, the authentication application 550 may be a mobile application or another type client application for interacting with a server-side authentication module (e.g., authentication module 540). The authentication application 550 may drive a sensor (e.g., a camera connected to or integrated with a user computing device) to capture one or more images of a user (e.g., user 530) that include views of the white of the user's eye. The authentication application 550 may prompt (e.g., through a display or speakers) the user to pose for image capture. For example, the user may be prompted to face the sensor and direct their gaze left or right to expose large portions of the white of an eye to the sensor.

In some implementations, the authentication application 550 transmits captured image data to an authentication module (e.g., authentication modules 525 or 540) on a remote server (e.g., server systems 512 or 514) through the network 511. The collection of image data from user may facilitate enrollment and the creation of a reference record for the user. The collection of image data from user may also facilitate authentication against a reference record for a user identity.

In some implementations, additional processing of the image data for authentication purposes may be performed by the authentication application 550 and the results of that processing may be transmitted to an authentication module (e.g., authentication modules 525 or 540). In this manner, the authentication functions may be distributed between the client and the server side processes in a manner suited a particular application. For example, in some implementations, the authentication application 550 determines liveness scores for captured images and rejects any images with liveness scores that indicate a spoof attack. If a liveness score indicates a live eye, image data, based on the accepted images, may be transmitted to a server side authentication module (e.g., authentication modules 525 or 540) for further analysis.

In some implementations, the authentication application accesses a reference record for a user identity and conducts a full authentication process, before reporting the result (e.g., user accepted or rejected) to a server side authentication module.

The authentication application 550 may be implemented as software, hardware or a combination of software and hardware that is executed on a processing apparatus, such as one or more computing devices (e.g., a computer system as illustrated in FIG. 9).

Figure 6:
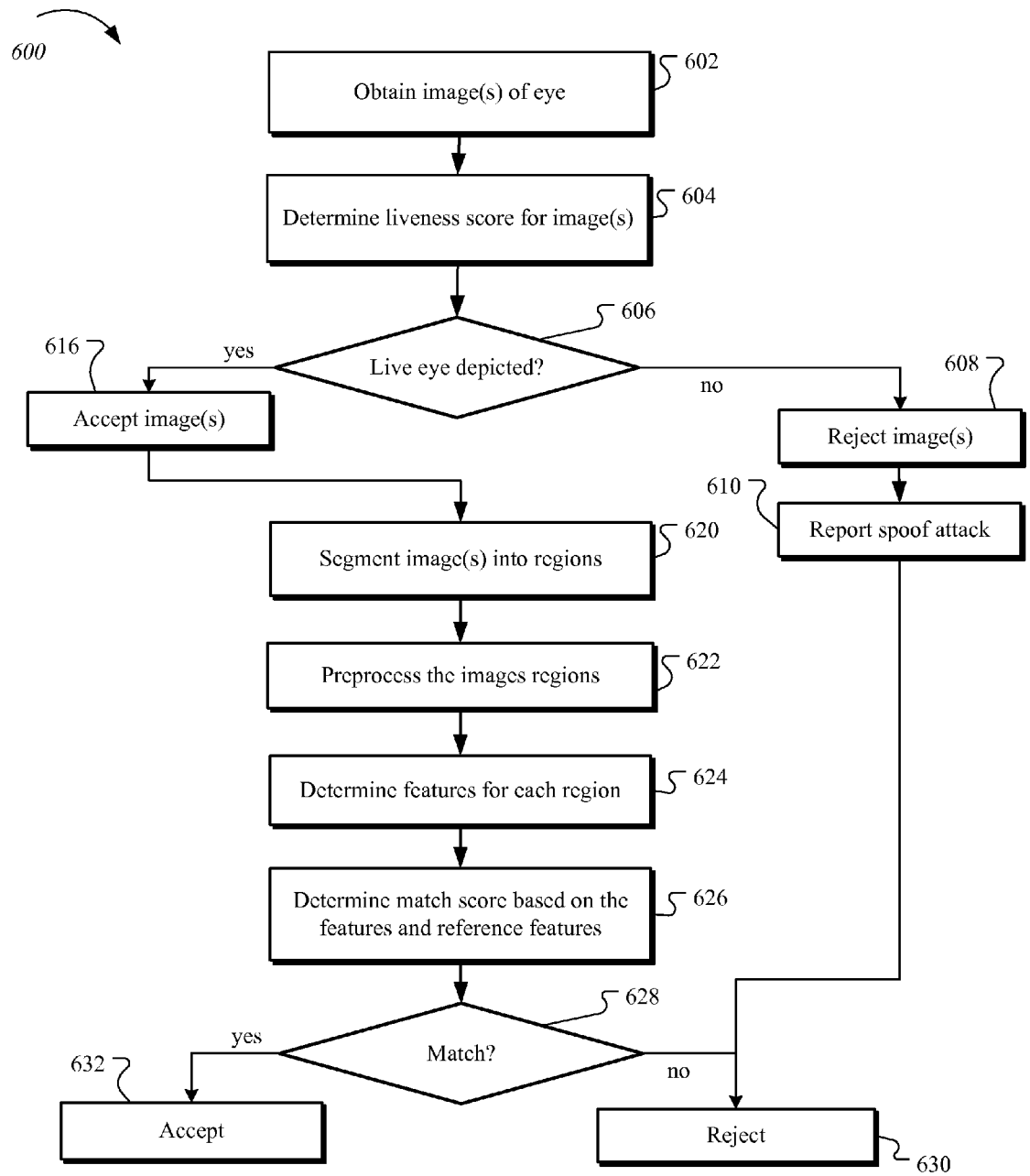
FIG. 6 is a flow chart of an example process for authenticating an individual based on one or more images of the white of an eye, where the liveness of the eye in the obtained images for authentication is checked.

FIG. 6 is a flow chart of an example process 600 for authenticating an individual based on one or more images of the white of an eye. A liveness score is determined for the obtained images and used to accept or reject the images. When an image of a live eye is detected and accepted, the image is further analyzed to determine a match score by extracting features from the image and comparing the features to a reference record. The user is then accepted or rejected based on the match score.

The process 600 can be implemented, for example, by the authentication module 440 in the computing device 430 of FIG. 4. In some implementations, the computing device 430 is a data processing apparatus that includes one or more processors that are configured to perform actions of the process 600. For example, the data processing apparatus may be a computing device (e.g., as illustrated in FIG. 9). In some implementations, process 600 may be implemented in whole or in part by the authentication application 550 that is executed by a user computing device (e.g., computing device 510). For example, the user computing device may be a mobile computing device (e.g., mobile computing device 950 of FIG. 9). In some implementations, process 600 may be implemented in whole or in part by the authentication module 540 that is executed by a user server system (e.g., server system 514). In some implementations, the server system 514 is a data processing apparatus that includes one or more processors that are configured to perform actions of the process 600. For example, the data processing apparatus may be a computing device (e.g., as illustrated in FIG. 9). In some implementations, a computer readable medium can include instructions that when executed by a computing device (e.g., a computer system) cause the device to perform actions of the process 600.

One or more images of an eye are obtained 602. The images include a view of a portion of a vasculature of the eye external to a corneal limbus boundary of the eye. The obtained images may be monochrome or represented in various color spaces (e.g., RGB, SRGB, HSV, HSL, or YCbCr). In some implementations, an image may be obtained using a light sensor (e.g., a digital camera, a 3D camera, or a light field sensor). The sensor may be sensitive to light in various ranges of wavelength. For example, the sensor may be sensitive to the visible spectrum of light. In some implementations, the sensor is paired with a flash or torch that can be pulsed to illuminate objects in view of the sensor. The capture of images can be synchronized or time-locked with pulsing of a flash. In some implementations, the sensor captures a sequence of images that can be used to track motion of objects within the field of view of the sensor. The sensor can include one more settings that control image capture (e.g., focus distance, flash intensity, exposure, and white balance). The images can collectively include a plurality of focus distances. For example, a sequence of images may be captured, each image captured with a different focus distance settings for the sensor and/or some sensors (e.g., a light field sensor) can capture an image that is focused at a plurality of distances from the sensor. In some implementations, the one or more images can be obtained 502 by reception through a network interface (e.g., a network interface of server system 514).

A liveness score can then be determined 604 for the one or more images. In some implementations, image data elements (e.g., a voxel, a pixel, a ray, or a red, green or blue channel value) are input directly to a trained function approximator that outputs a liveness score. The function approximator can be trained using data corresponding to training images of both live eyes and spoof props that are paired with ideal scores (e.g., 1 for live eyes and 0 for spoof props). The function approximator or classifier models the mapping from input data (i.e., the training image data or features) to output data (i.e., the resulting liveness score or binary decision) with a set of model parameters. The model parameter values are selected using a training algorithm that is applied to the training data. For example, the function approximator can be based the following models: linear regression, Volterra series, Wiener series, radial basis functions, kernel methods, polynomial methods; piecewise linear models, Bayesian classifiers, k-nearest neighbor classifiers, neural networks, support vector machines, or fuzzy function approximator. Other models are possible. In some implementations, the liveness score may be binary.

In some implementations, the liveness score is determined 604 based on one or more liveness metrics that in turn are determined based on the obtained images. Some examples of such a process are described in relation to FIG. 7.

For example, the liveness score can be determined 604 by the authentication module 440, the authentication application 550, authentication module 525, or the authentication module 540.

The liveness score is checked 606 to determine whether the images are likely to include a view of a live eye. In some implementations, the liveness score can be compared to a threshold.

If the liveness score indicates a low likelihood of a live eye and thus a high likelihood of a spoof attack, the one or more images are rejected 608. In some implementations, a spoof attack may then be reported 610. In some implementations, the spoof attack is reported 610 through a display or speaker (e.g., with an alarm sound or flashing display). In some implementations, the spoof attack is reported 610 by transmitting one or messages over a network using a network interface. The user may then be rejected 630 and denied access to secured device or service.

In some implementations (not shown), a check may be performed to verify that obtained images were captured from a particular sensor and that that the particular sensor has not been bypassed by the submission of spoofed image data. For example, during image capture, one or more sensor configuration settings may be adjusted to take on different settings during capture of two or more of the images. These different settings are expected to be reflected in the obtained image data. If changes in the image data between images with different settings, it may indicate that the sensor has been bypassed by a spoof attack. For example, sensor configuration settings controlling focus, exposure time, or white balance may be adjusted in this manner. If corresponding changes in the obtained image data are not detected, the obtained images may be rejected 608.

If the liveness score indicates a high likelihood that live eye is depicted in the images, the one or more images are accepted 616 and subjected to further analysis to complete the authentication process.

The one or more images may be segmented 620 to identify regions of interest that include the best views of vasculature in the white of an eye. In some implementations, anatomical landmarks (e.g., an iris, its center and corneal limbus boundary, eye corners, and the edges of eyelids) may be identified in the one or more images. Regions of interest within the image may be identified and selected based on their location in relation to the identified anatomical landmarks. For example, regions of interest may be located in the white of eye to the left, right, above, or below the iris. In some implementations, the selected regions of interest are tiled to form a grid covering a larger portion of the white of the eye. In some implementations, the selected regions of the image are noncontiguous (e.g., neighboring regions may overlap or neighboring regions may have space between them). The selected regions of interest may correspond to regions of interest selected from a reference image on which data in a reference record is based.

In some implementations, eye corners are found by fitting curves on the detected portions of the eyelid over sclera, and then extrapolating and finding the intersection of those curves. If one intersection (corner) cannot be found due to the fact that the iris was too close (e.g., due to gaze direction), then a template from the same corner area but from the opposite gaze direction photo can be derived and applied to the problematic corner neighborhood in the image at hand, and the maximum correlation location can be tagged as the corner.

In some implementations, eyelids are found by adaptive thresholding methods that find the white of the eye from the image, which border the eyelids. The sclera mask itself can be corrected by morphological operations (e.g., convex hull) to take out aberrations.

In some implementations, the limbic boundary is found from the sclera mask as where the sclera ends due to its termination at the iris limbic boundary.

In some implementations, the iris center is found through multiple methods. If the eye color is light, the center of the pupil can be found as the iris center. If the iris is too dark, then the center of the ellipsoid fitted to the limbic boundary and its center is found, or it is determined as the focal point of normal rays (i.e., lines perpendicular to tangents to the limbic boundary) converging around the iris center, or a combination of the above methods.

The image regions may be preprocessed 622 to enhance the view of a vasculature within an image. In some implementations, preprocessing 622 includes Color Image Enhancement and Contrast Limited Adaptive Histogram Equalization (CLAHE) which enhances the contrast of the intensity image. CLAHE operates in small regions of the image called tiles. Each tile's contrast is enhanced such that the histogram of the output approximately matches the histogram specified by particular distribution (e.g., uniform, exponential, or Rayleigh distribution). The neighboring tiles are then combined using bilinear interpolation to eliminate the artificially induced boundaries. In some implementations, the images may be enhanced by selecting one of the red, green or blue color components which has the best contrast between the vessels and the background. The green component may be preferred because it may provide the best contrast between vessels and background.

In some implementations, preprocessing 622 includes application of a multi-scale enhancement filtering scheme to enhance the intensity of the images thereby facilitating detection and subsequent extraction features of the vascular structure. The parameters of the filter may be determined empirically so as to account for variations in the girth of the blood vessels. The algorithm used may have good sensitivity, good specificity for curves and suppresses objects of other shapes. The algorithm may be based on the second derivatives of the image. First, since the second derivatives are sensitive to noise, an image segment is convolved with a Gaussian function. The parameter $\sigma$ of the Gaussian function may correspond to the thickness of a blood vessel. Next, for each image data element, a Hessian matrix may be built and eigenvalues $\lambda 1$ and $\lambda 2$ may be computed. In each Hessian matrix ridges are defined as points where the image has an extremum in the direction of the curvature. The direction of the curvature is the eigenvector of the second order derivatives of the image that corresponds to the largest absolute eigenvalue λ. The sign of the eigenvalue determines if it is a local minimum λ>0 or maximum λ<0. The computed eigenvalues are then used to filter the blood vessel line with the equations:

$$I\_line(\lambda 1, \lambda 2) = |\lambda 1| - |\lambda 2| \text{ if } \lambda 1 < 0 \text{ and } I\_line(\lambda 1, \lambda 2) = 0 \text{ if } \lambda 1 > 0$$

The diameter of the blood vessels varies but the algorithm assumes the diameter is within an interval, [d0, d1]. Gaussian smoothing filters may be employed in the scale range of [d0/4, d1/4]. This filtering may be repeated N times based on the smoothing scales:

$$\sigma 1 = d0/4, \sigma 2 = r^*\sigma 1, \sigma 2 = r^2{}^*\sigma 1, \ldots \sigma 2 = r^{(N-1)}{}^*\sigma 1 = d1/4$$

This final output may be the maximum value from the output of all individual filters of N scales.

Features are determined 624 for each image region that reflect structure or properties of the vasculature visible in that region of the user's eye. In some implementations, minutia detection methods may be used to extract features of the user's vasculature. Examples of minutia detection processes are described in U.S. Pat. No. 7,327,860.

In some implementations, features may be determined 624 in part by applying a set of filters to the image regions that correspond to texture features of those image regions. For example, features may be determined in part by applying a set of complex Gabor filters at various angles to the image. The parameters of the filter can be determined empirically so as to account for variations in the spacing, orientation, and girth of the blood vessels. The texture features of an image can be measured as the amount of sharp visible vasculature in the region of interest. This quality can be determined with the ratio of area of sharp visible vasculature to the area of region of interest. The phase of Gabor filtered image, when binarized using a threshold, may facilitate detection and reveal sharp visible vasculature.

The phase of complex Gabor filtered image reflects the vascular patterns at different angles when the Gabor filter kernel is configured with Sigma=2.5 Pixel, Frequency=6; and Gamma=1. The choice of frequency may be dependent on the distance between vessels, which in turn depends on the resolution and distance between image acquisition system and the subject. These parameters may be invariant to images. For example, the kernel parameters may be derived for eye images captured at a distance of 6-12 centimeters away from the eye using a particular sensor (e.g. a back camera on a smartphone) and the segmented sclera region can be resized to a resolution of (e.g., 401×501 pixels) for the analysis. Visible eye surface vasculature may be spread in all the directions on white of the eye. For example, the Gabor kernels may be aligned across six different angles (Angle=0, 30, 60, 90, 120, and 150 degrees). The phase of the Gabor-filtered images may vary from −π to +π it radians. Phase values above 0.25 and below −0.25 radians may correspond to vascular structures. To binarize the phase image using thresholding, all values of phase above 0.25 or below −0.25 may be set to one and the remaining values to zero. This may result in a sharp vasculature structure in corresponding phase image. This operation can be performed for images resulting from applications of all six Gabor kernels at different angles. All the six binarized images may be added, to reveal a fine and crisp vascular structure. In some implementations, a vector of the elements of the binarized phase images may be used as a feature vector for comparing the image to a reference record. In some implementations, differences in textural features between image regions of interest may be used as a feature vector. The sum of all the 1's in a binarized image area divided by the area of region of interest may reflect the extent of the visible vasculature.

A match score is determined 626 based on the features and corresponding features from a reference record. The reference record may include data based at least in part on one or more reference images captured during an enrollment or registration process for a user. In some implementations, a match score may be determined 626 as a distance (e.g., a Euclidian distance, a correlation coefficient, modified Hausdorff distance, Mahalanobis distance, Bregman divergence, cosine similarity, Kullback-Leibler distance, and Jensen-Shannon divergence) between a vector of features extracted from the one or more obtained images and a vector of features from the reference record. In some implementations, the match score may be determined 626 by inputting features extracted from the one or more obtained images and features from the reference record to a trained function approximator.

In some implementations, a quality based fusion match score is determined 626 based on match scores for multiple images of the same vasculature. In some implementations, match scores for multiple images are combined by adding the match scores together in weighted linear combination with weights that respectively depended on quality scores determined for each of the multiple images. Other examples of techniques that may be used to combine match scores for multiple images based on their respective quality scores include hierarchical mixtures, sum rule, product rule, gated fusion, Dempster-Shafer combination, and stacked generalization, among others.

In some implementations, the match score is determined 626 by an authentication module (e.g., authentication module 440 running on computing device 430).

The match score may be checked 628 to determine whether there is a match between the one or more obtained images and the reference record. For example the match score may be compared to a threshold. A match may reflect a high likelihood that the user whose eye is depicted in the one or more obtained images is the same as an individual associated with the reference record.

If there is no match, then the user may be rejected 630. As a result, the user may be denied access to a secure device or service (e.g., secured device 450 or secure transaction service 523). In some implementations, the user may be informed of the rejection 630 through a message that is shown on a display or played through a speaker. In some implementations, the rejection may be affected by transmitting a message through a network reflecting the status of the user as rejected. For example, the authentication module 540, upon rejecting user 530 may transmit a rejection message to the secure transaction server 523 using a network interface of server system 514. The authentication module 540 may also send a rejection message to user computing device 510 in this scenario.

If there is a match, then the user may be accepted 632. As a result, the user may be granted access to a secure device or service (e.g., secured device 450 or secure transaction service 523). In some implementations, the user may be informed of the acceptance 632 through a message that is shown on a display or played through a speaker. In some implementations, the acceptance may be affected by transmitting a message through a network reflecting the status of the user as accepted. For example, the authentication module 540, upon accepting user 530 may transmit an acceptance message to the secure transaction server 523 using a network interface of server system 514. The authentication module 540 may also send an acceptance message to user computing device 510 in this scenario.

Figure 7:
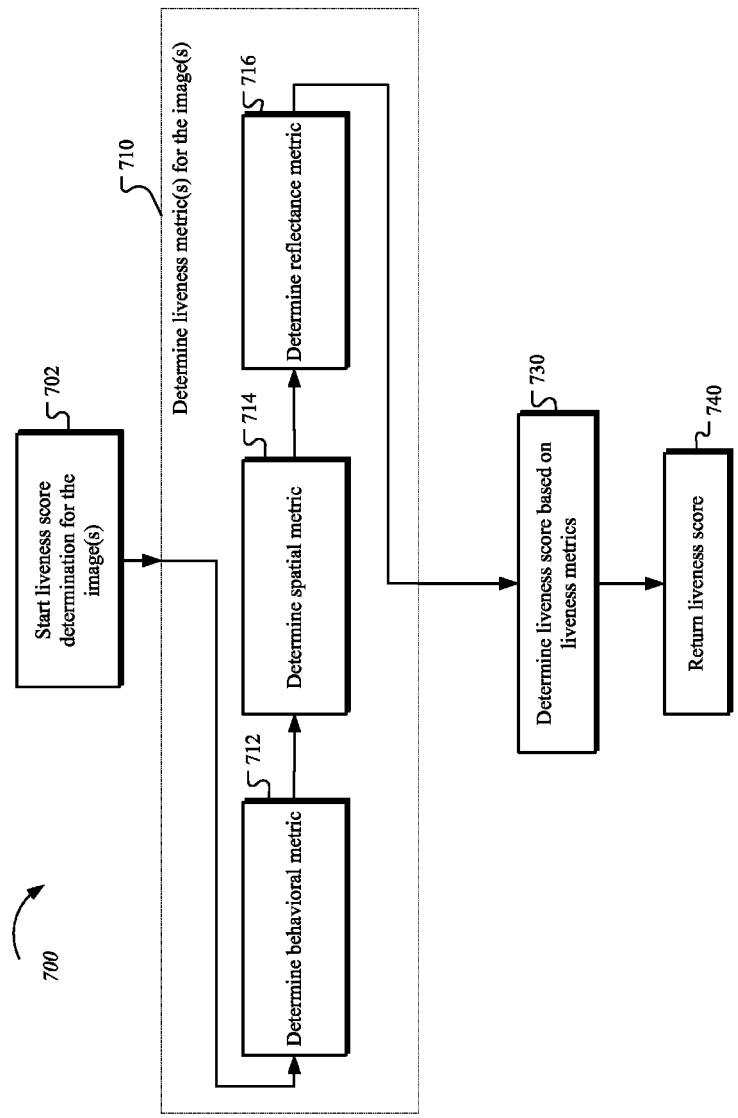
FIG. 7 is a flow chart of an example process for determining a liveness score for one or more images of an eye.

FIG. 7 is a flow chart of an example process 700 for determining a liveness score for one or more images of an eye. One or more liveness metrics are determined 710 for the images and the liveness score is determined 730 based on the one or more liveness metrics.

The process 700 can be implemented, for example, by the authentication module 440 in the computing device 430 of FIG. 4. In some implementations, the computing device 430 is a data processing apparatus that includes one or more processors that are configured to perform actions of the process 700. For example, the data processing apparatus may be a computing device (e.g., as illustrated in FIG. 9). In some implementations, process 700 may be implemented in whole or in part by the authentication application 550 that is executed by a user computing device (e.g., computing device 510). For example, the user computing device may be a mobile computing device (e.g., mobile computing device 950 of FIG. 9). In some implementations, process 700 may be implemented in whole or in part by the authentication module 540 that is executed by a user server system (e.g., server system 514).

In some implementations, the server system 514 is a data processing apparatus that includes one or more processors that are configured to perform actions of the process 700. For example, the data processing apparatus may be a computing device (e.g., as illustrated in FIG. 9). In some implementations, a computer readable medium can include instructions that when executed by a computing device (e.g., a computer system) cause the device to perform actions of the process 700.

Process 700 starts 702 when one or more images are received for processing. For example, the one or more images may be encoded as two, three, or four dimensional arrays of data image elements (e.g., a pixel, a voxel, a ray, or a red, green or blue channel value).

One or more liveness metrics may then be determined 710 based on the one or more images. In this example, a behavioral metric is determined 712 based on detected movement of the eye as the eye appears in a plurality of the images. The behavioral metric can be a measure of deviation of detected movement and timing from expected movement of the eye.

In some implementations, photic stimuli (e.g., a flash pulse, a change brightness of an LCD display) are applied to a subject while the images are being captured. In response to these photic stimuli, a pupil of a live eye is expected to constrict to adapt to the change in illumination. Further the pupil is expected to constrict in a certain way over time with, an onset time that depends on the reaction time of a user, a duration of the constriction movement required to reach a new steady state pupil diameter, an average velocity of constriction, and a particular acceleration curve for the constriction motion. By examining a sequence of images captured before and after the start of a photic stimulus, one or more parameters of a detected motion may be determined and compared to one or more parameters of the expected motion. A substantial deviation from the expected motion in response to the photic stimuli may indicate the subject in view of the camera is not a live eye and there is spoof attack occurring. An example of this implementation is described in relation to FIG. 8A.

In some implementations, a behavioral metric may be determined 712 by applying external stimuli (e.g., prompts instructing a user to direct their gaze or a display showing a moving object that user follows with their eyes) to a subject during image capture and tracking the gaze transitions that may result. In response to these external stimuli, a live eye is expected to move in a certain way over time. Some parameters of an expected gaze transition motion may include an onset time that depends on the reaction time of a user, a duration of the gaze transition movement required to reach a new steady state gaze direction, an average velocity, and a particular acceleration curve for the gaze transition motion. By examining a sequence of images captured before and after the start of an external stimulus, one or more parameters of a detected motion may be determined and compared to one or more parameters of the expected motion. A substantial deviation from the expected motion in response to the external stimuli may indicate the subject in view of the camera is not a live eye and there is spoof attack occurring. An example of this implementation is described in relation to FIG. 8B.

In some implementations, determining 712 a behavioral metric may include detecting flow of blood in a vasculature of the white of the eye (e.g. vasculature in the episclera). A sequence of images may be analyzed to detect changes in hue and changes in visible width of veins and blood vessels in the white of the eye that occur over time. The vasculature of a live eye is expected to exhibit regular changes in vessel widths and hue that correspond to a user's pulse. A substantial deviation from the expected blood flow pattern may indicate the subject in view of the camera is not a live eye and there is spoof attack occurring.

For example, consider a section of vasculature between two branching points or sharp bends. The tubular body of that vessel change shape and color when the heart is pumping blood through it. In some implementations, 300 frames or images may be captured over a 10 second period. Image regions may be registered from one capture instance to the next. The blood flow may then be measured by comparing the physical dimensions (2d or 3d) of points of interest along blood vessels over time, as well as the coloration of those vessels over time. In this manner, changes consistent with pulse can be detected. For example if the measure "pulse" signal resembled a square wave that would not be consistent with a natural circulatory system. If it consisted of spikes (both vessel dilation and appropriate coloration change) at regular intervals over time within normal range for a human user, possibly even for the specific user, then the input is likely to correspond to a real live pulse. A distance between the measure pulse signal and an expected pulse signal may be determined to assess the likelihood that the subject is a live eye rather than a spoof attack.

In some implementations, the expected motion parameters are specific to a particular user and are determined during an enrollment session and stored as part of a reference record for the particular user. In some implementations, the expected motion parameters are determined for a population based on a large collection of user data or offline studies.

For example, a behavioral metric may be determined 712 by an authentication module or application (e.g., authentication module 440).

In this example, a spatial metric is determined 714 based on a distance from a sensor to a landmark that appears in a plurality of the images each having a different respective focus distance. Focus distance is the distance from a sensor to a point in its field of view that is perfectly in focus. For some sensors, the focus distance may be adjusted for different images by adjusting a focus configuration setting for the sensor. For example, a landmark (e.g., an iris, an eye corner, a nose, an ear, or a background object) may be identified and located in the plurality of images with different focus distances. A landmark's representation in a particular image has a degree of focus that depends on how far the object corresponding to the landmark is from an in focus point in the field of view of the sensor. Degree of focus is a measure of the extent to the image of the landmark is blurred by optical effects in the light sensor (e.g., due to diffraction and convolution with the aperture shape). The degree of focus for a landmark in a particular image may be estimated by determining the high frequency components of the image signal in the vicinity of the landmark. When the landmark is in focus, more high frequency components in its vicinity are expected. When the degree of focus is low for a landmark, smaller high frequency components are expected. By comparing the degree of focus for a landmark in images with different focus distances, the distance from the sensor to the landmark may be estimated. In some implementations, distances from the sensor (e.g. a camera) for multiple landmarks are estimated to form a topological map (consisting of a set of three-dimensional landmark positions) of the subject in the view of the sensor. The positions of these landmarks in the space viewed by the camera may be compared to a model by determining a spatial metric (e.g., the mean square difference between the detected location of one or more landmarks and the corresponding modeled locations of the one or more landmarks) that reflects deviation from the model.

In some implementations, the spatial metric is a measure of the deviation of the subject from a two-dimensional plane. One possible spoofing strategy is to present a two dimensional image (e.g., a photograph) of a registered user's eye to the sensor. However the locations of landmarks (e.g., an eye, nose, mouth, and ear) in the two dimensional image will occur in a two dimensional plane, unlike landmarks in and around a real live eye. For example, the locations of multiple landmarks may be fit to the closest two dimensional plane and the average distance of the landmarks from this fit plane can be determined as the spatial metric. A high value for this spatial metric may indicate a three-dimensional subject and a higher likelihood that the subject is a live eye, while a low value may indicate a higher likelihood that the subject is a two-dimensional spoof attack.

In some implementations, the spatial metric is a measure of the deviation of the subject from an expected three-dimensional shape. A three-dimensional model including locations of landmarks corresponding to an expected shape for a subject including the live eye of a user may be used for comparison to the detected landmark locations. In some implementations, the relative positions of landmarks on a particular user's face may be determined during an enrollment session and used generate a three-dimensional model that is stored as part of a reference record. In some implementations, three-dimensional model for a population of users may be determined based on an aggregation of measurements or studies of a large number of people. Various types of metrics can be used as a spatial metric to compare the detected landmark positions to the expected shape (e.g., a Euclidian distance, a correlation coefficient, modified Hausdorff distance, Mahalanobis distance, Bregman divergence, Kullback-Leibler distance, and Jensen-Shannon divergence).

In some implementations, determining 714 the spatial metric comprises determining parallax of two or more landmarks that appear in a plurality of the images. Parallax is the apparent displacement of an observed object due to a change in the position of the observer. A plurality of images taken from different perspectives on the subject may result in landmarks within the images appearing to move by different amounts because of differences in their distance from the sensor. This parallax effect may be measured and used as a spatial metric that reflects the three-dimensional nature of a subject in the view of the sensor. If all the landmarks in in the images undergo the same apparent displacement due to relative motion of the sensor, i.e., the difference in the parallax effect for the landmarks is small, then the subject viewed by the camera has higher likelihood of being a two-dimensional spoof attack. In some implementations, the sensor is moved about the subject during image capture to collect image data from different orientations relative to the subject. For example, a single camera may be rotated or slid slightly or multiple cameras at different positions may be used for image capture. In some implementations, a user is prompted to move in order to change the relative orientation of the subject and the sensor. In some implementations, it is assumed that sensor will naturally move relative to the subject. For example, where the sensor is a camera in hand-held user device (e.g. a smartphone or tablet) the sensor may naturally move relative to the users face due to involuntary haptic motion.

For example, a spatial metric may be determined 714 by an authentication module or application (e.g., authentication module 440).

In this example, a reflectance metric is determined 716 based on detected change in surface glare or specular reflection patterns on a surface of the eye as the eye appears in a plurality of the images. The reflectance metric may be a measure of changes in glare or specular reflection patches on the surface of the eye. As the illumination of an eye in the view of the sensor changes, due to relative motion of the eye and a light source or to changes in a dynamic light source (e.g., a flash, LCD screen, or other illumination element), the glare and specular reflection patterns visible on the eye are expected to change by appearing, disappearing, growing, shrinking, or moving. In some implementations, changes in the illumination are induced during image capture by photic stimuli (e.g. a flash pulse) or external stimuli (e.g. a prompt instructing a user to change gaze direction). For example, glare, including its boundaries, can be detected by thresholding a contrast enhanced image to find the whitest spots. Detected changes in the glare or specular reflection patterns on the eye in the images may be compared to expected changes in the these patterns by determining 716 a reflectance metric that measures the deviation of the detected change from an expected change.

We are looking for changes in the area and shape of this glare. One can also look at the ratio of circumference to area of the glare patch.

In some implementations, a flash may be pulsed to illuminate the subject while one or more of the images are being captured. Glare from the flash may be detected on the eye as it appears in the images. The pulsing of the flash may be synchronized with image capture so that the time difference between when the flash is pulsed and when the corresponding glare appears in the images can be measured. The reflectance metric may be based on this time difference. Large deviations from the expected synchronization or time-lock of the flash pulse and the onset of a corresponding glare or specular reflection may indicate a spoof attack. For example, a replay attack uses pre-recorded video of a capturing scenario. Glare changes in the pre-recorded video are unlikely to be time-locked to a real-time flash event during the current session. Another example is presenting a printed image of an eye to the sensor, in which case glare may spread across the printed image in an unnaturally uniform manner or may not change perceivably due to a lack of moisture on the viewed surface. If no corresponding glare or specular reflection is detected, the reflectance metric may be determined to be a large arbitrary number corresponding to poor synchronization or a lack of time-lock between the flash and detected glare or specular reflection.

In some implementations, changes in illumination may be detected as changes as changes in the uniformity of a glare pattern caused by greater amounts of fine three-dimensional texture of a white of the eye being revealed as the intensity of the illumination is increased. For example, a flash may be pulsed to illuminate the subject at higher intensity while one or more of the images are being captured. Fine three-dimensional texture of a white of the eye may be detected by measuring uniformity of a pattern of glare on the eye in the images before and after the onset of the flash pulse. For example, the uniformity of the glare of specular reflection pattern may be measured as the ratio of circumference to the area of the glare. The larger this number compared to 2/R, the more non-circular and non-uniform the glare (R is the estimated radius of the glare patch). In some implementations, a function approximator (e.g., a neural network) is trained to distinguish between specular reflection patterns recorded from live eyeballs vs. synthesized eyeballs, such as 3D printed eyeballs, using a sensor with an illumination element (e.g., a flash).

For example, a reflectance metric may be determined 716 by an authentication module or application (e.g., authentication module 440).

In some implementations (not shown), additional liveness metrics may be determined 710. For example, a metric reflecting the extent of saccadic motion of the eye in the view of the sensor may be determined. An iris of the eye may be landmarked in a sequence of images so that its position or orientation may be tracked. This sequence of positions or orientations may be analyzed to determine extent of saccadic motion, by filtering for motions at a particular frequency associated with normal saccadic motion.

In some implementations, a liveness metric may be determined 710 that reflects the extent of halftones in a captured image. Halftones are artifacts of digital printed images that may be used in a spoof attack and thus their presence may indicate a high likelihood of a spoof attack. For example, one or more images may be captured using a reduced dynamic range for the sensor (e.g., a camera) so that a finer resolution in intensity of detected light is achieved in a range within which it occurs in the captured images. In this manner, the intensity or color scale can be zoomed in to reveal more subtle changes in the level of the detected image signal. If the captured images are of a live eye, it is expected that the range of color or intensity values detected will continue to vary continuously. In contrast, a spoofed image (e.g. a digital photograph presented to the sensor) may exhibit large discontinuous jumps corresponding to halftones. The extent of halftones in the image may be measured in a variety of ways (e.g., as average or maximum eigenvalues of a Hessian matrix evaluated in a region of the image or as high frequency components of the image signal). In some implementations, images with a halftone metric above a threshold are rejected. In some implementations, histograms of gray shades in the image are generated and the uniformity of the distribution between grey level bins (e.g., 256 bins) is measured.

In some implementations, the liveness metrics are determined 710 in parallel. In some implementations, the liveness metrics are determined 710 in series.

The liveness score may then be determined 730 based on the one or more liveness metrics. In some implementations, the liveness score is determined by inputting the one or more liveness metrics to a trained function approximator.

The function approximator may be trained using data corresponding to training images of live eyes and various spoof attacks that have been correctly labeled to provide a desired output signal. The function approximator models the mapping from input data (i.e., the training image liveness metrics) to output data (i.e., a liveness score) with a set of model parameters. The model parameter values are selected using a training algorithm that is applied to the training data. For example, the function approximator may be based the following models: linear regression, Volterra series, Wiener series, radial basis functions, kernel methods, polynomial methods; piecewise linear models, Bayesian classifiers, k-nearest neighbor classifiers, neural networks, support vector machines, or fuzzy function approximator. In some implementations, the liveness score may be binary.

For example, the liveness score may be determined 730 based on one or more liveness metrics by an authentication module or application (e.g., authentication module 440).

The resulting liveness score may then be returned 740 and may be used by an authentication system (e.g., authentication system 400) in variety of ways. For example, the liveness score may be used to accept or reject the one or more images.

Figure 8A:
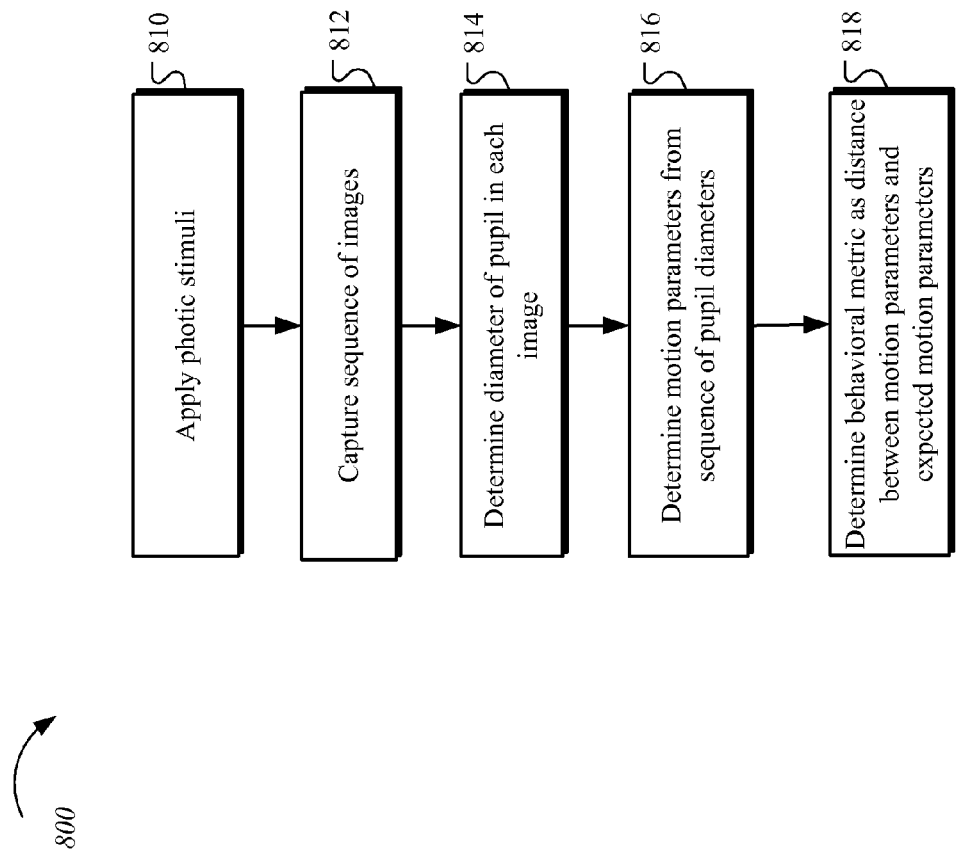
FIG. 8A is a flow chart of an example process for determining a behavioral metric based on constriction of a pupil in response to photic stimulus.

FIG. 8A is a flow chart of an example process 800 for determining a behavioral metric based on constriction of a pupil in response to photic stimulus. One or more photic stimuli are applied 810 to the scene viewed by a sensor (e.g. light sensor 420). For example, the photic stimuli may include a flash pulse or a change in the brightness of a display (e.g., an LCD display). A sequence of images is captured 812 by the sensor before and after the start of the photic stimuli. For example, the sequence of images may be captured at regularly spaced times (e.g., at 10, 30, or 60 Hz) in an interval (e.g., 2, 5, or 10 seconds) that includes the start of the photic stimuli.

In some implementations, a pupil is landmarked in each of the captured images and the diameter of the pupil is determined 814 in each captured image. The diameter may be determined 814 relative to a starting diameter for the pupil that is measured in one or more images captured before the start of the photic stimuli.

The resulting sequence of pupil diameters measured in response to the photic stimuli may be analyzed to determine 816 one or more motion parameters for the constriction of the pupil in response to the photic stimuli. In some implementations, motion parameters of the pupil constriction may include an onset time of the constriction motion relative to the start of the photic stimuli. Onset is the time delay between the start of the photic stimuli and the start of the constriction motion. In some implementations, motion parameters of the pupil constriction may include a duration of the constriction motion. Duration is the length of time between the start of the constriction motion and the end of the constriction motion, when the pupil diameter reaches a new steady state value (e.g., after which the diameter does not change for a minimum interval of time). In some implementations, motion parameters of the pupil constriction may include a velocity of pupil constriction. For example, the velocity may be determined as difference in pupil diameters between two points in time divided by the length of the time interval between them. In some implementations, motion parameters of the pupil constriction may include an acceleration of the pupil constriction in different time segments of constriction period. For example, the acceleration may be determined as a difference in velocities between two intervals.

The behavioral metric may be determined 818 as a distance between one or more determined motion parameters and one or more expected motion parameters. For example, the behavior metric may include a difference between a detected onset time and an expected onset time for a live eye. For example, the behavior metric may include a difference between a detected duration and an expected duration of pupil constriction for a live eye. In some implementations, a sequence of pupil diameters is compared to an expected sequence of pupil diameters by determining a distance (e.g., a Euclidian distance, a correlation coefficient, modified Hausdorff distance, Mahalanobis distance, Bregman divergence, Kullback-Leibler distance, and Jensen-Shannon divergence) between the two sequences. In some implementations, a sequence of pupil constriction velocities for the constriction motion is compared to an expected sequence of pupil constriction velocities by determining a distance between the two sequences of velocities. In some implementations, a sequence of pupil constriction accelerations for the constriction motion is compared to an expected sequence of pupil constriction accelerations by determining a distance between the two sequences of accelerations.

For example, the process 800 may be implemented by an authentication module or application (e.g., authentication module 440) controlling a light sensor (e.g. light sensor 420) and an illumination element.

Figure 8B:
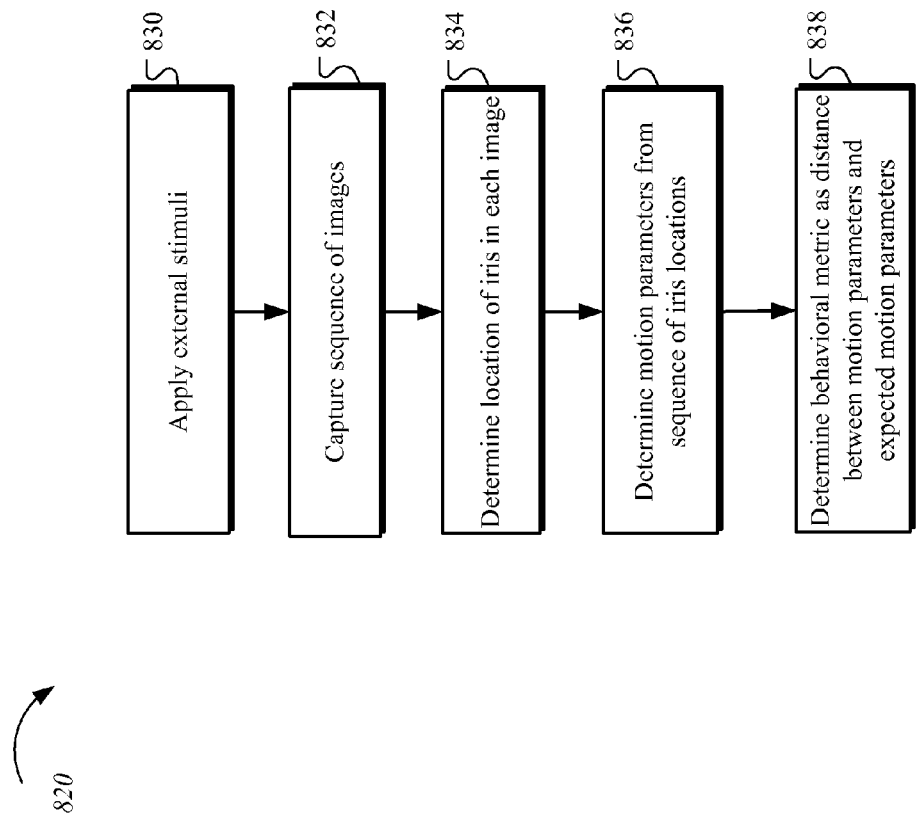
FIG. 8B is a flow chart of an example process for determining a behavioral metric based on gaze transition of an iris in response to external stimulus.

FIG. 8B is a flow chart of an example process 820 for determining a behavioral metric based on gaze transition of an iris in response to external stimulus. One or more external stimuli are applied 830 to a user viewed by a sensor (e.g. light sensor 420). For example, the external stimuli may include prompts instructing a user to direct their gaze (e.g., look right, left, up, down, or straight ahead) during image capture. Prompts may be visual, auditory, and/or tactile. In some implementations, the external stimuli can include an object that moves within in display for user's eyes to follow.

A sequence of images is captured 832 by the sensor before and after the start of the external stimuli. For example, the sequence of images may be captured at regularly spaced times (e.g., at 10, 30, or 60 Hz) in an interval (e.g., 2, 5, or 10 seconds) that includes the start of the external stimuli.

In some implementations, an iris is landmarked in each of the captured images and the position or orientation of the iris is determined 834 in each captured image. The position may be determined 834 relative to a starting position for the iris that is measured in one or more images captured before the start of the external stimuli.

The resulting sequence of iris positions measured in response to the external stimuli may be analyzed to determine 836 one or more motion parameters for the gaze transition in response to the external stimuli. In some implementations, motion parameters of the gaze transition may include an onset time of the gaze transition motion relative to the start of the external stimuli. Onset is the time delay between the start of the external stimuli and the start of the gaze transition motion. In some implementations, motion parameters of the gaze transition may include a duration of the gaze transition motion. Duration is the length of time between the start of the gaze transition motion and the end of the gaze transition motion, when the iris reaches a new steady state position (e.g., after which the iris does not move for a minimum interval of time). In some implementations, motion parameters of the gaze transition may include a velocity of gaze transition. For example, the velocity may be determined as difference in iris positions between two points in time divided by the length of the time interval between them. In some implementations, motion parameters of the gaze transition may include an acceleration of the gaze transition. For example, the acceleration may be determined as a difference in velocities between two intervals.

The behavioral metric may be determined 838 as a distance between one or more determined motion parameters and one or more expected motion parameters. For example, the behavior metric may include a difference between a detected onset time and an expected onset time for a live eye. For example, the behavior metric may include a difference between a detected duration and an expected duration of pupil constriction for a live eye. In some implementations, a sequence of iris positions is compared to expected sequence of iris positions by determining a distance (e.g., a Euclidian distance, a correlation coefficient, modified Hausdorff distance, Mahalanobis distance, Bregman divergence, Kullback-Leibler distance, and Jensen-Shannon divergence) between the two sequences. In some implementations, a sequence of transition velocities for the gaze transition motion is compared to expected sequence of transition velocities by determining a distance between the two sequences of velocities. In some implementations, a sequence of gaze transition accelerations for the constriction motion is compared to an expected sequence of gaze transition accelerations by determining a distance between the two sequences of accelerations.

For example, the process 820 may be implemented by an authentication module or application (e.g., authentication module 440) controlling a light sensor (e.g. light sensor 420) and a prompting device (e.g., a display, a speaker, or a haptic feedback device).

FIG. 9 shows an example of a generic computer device 900 and a generic mobile computing device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or a memory on processor 902, for example.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   capturing, using a light sensor, a two or more images of a subject including a view of an eye of the subject while changing a focus distance of the light sensor at different times and according to a pattern such that a plurality of the images have different respective focus distances;
   detecting a respective degree of focus for each of a plurality of the images;
   calculating a first metric based on a determination of whether the detected respective degrees of focus correspond to the pattern;
   calculating, for each of two or more landmarks, a respective distance of the landmark to the sensor based on respective degrees of focus of the landmark in a plurality of the images;
   calculating a second metric based on a determination of whether the landmarks lie in a same plane based on the respective distances; and
   rejecting or accepting the images based on, at least, the first metric and the second metric.

2. The method of claim 1 wherein a particular focus distance is a distance from the sensor to a point in a field of view of the sensor that is in focus.

3. The method of claim 1 wherein detecting the respective degree of focus of the image comprises measuring an extent that a landmark in the image is blurred.

4. The method of claim 3 wherein measuring the extent that the landmark in the image is blurred comprises identifying a quantity of high frequency components of the image in a vicinity of the landmark.

5. The method of claim 1 wherein the landmark is one of an iris, an eye corner, a nose, and an ear.

6. The method of claim 1 comprising changing a white balance or an exposure time of the light sensor at different times during the capturing and according to a second pattern such that a plurality of the images have different respective white balances or different respective exposure times.

7. The method of claim 6 wherein rejecting or accepting the images based on, at least, the first metric comprises:
   detecting a respective white balance or a respective exposure time for each of a plurality of the images;
      calculating a second metric based on a determination of whether the detected respective white balances or respective exposure times correspond to the second pattern; and
   rejecting or accepting the images based on the first metric and the second metric.

8. The method of claim 1 wherein rejecting or accepting the images based on, at least, the first metric comprises:
   providing the first metric and one or more second metrics to a trained function approximator that was trained using training images and the first and second metrics as applied to the training images; and
   rejecting or accepting the images based on an output of the function approximator.

9. The method of claim 8 wherein a particular second metric is based on one of: a measure of deviation of detected movement of the eye from expected movement of the eye as the eye appears in a plurality of the images, and changes in glare or specular reflection patterns on a surface of the eye as the eye appears in a plurality of the images.

10. The method of claim 9 wherein the detected movement of the eye is a measure of saccadic motion.

11. The method of claim 9 wherein the detected movement of the eye is a measure of onset, duration, or acceleration of gaze transition.

12. The method of claim 1 comprising changing illumination of the subject at different times during the capturing and according to a second pattern such that a plurality of the images have different respective illuminations.

13. The method of claim 12 wherein rejecting or accepting the images based on, at least, the first metric comprises:
   detecting a respective illumination changes for each of a plurality of the images;
   calculating a second metric based on a determination of whether the detected illumination changes correspond to the second pattern; and
   rejecting or accepting the images based on the first metric and the second metric.

14. A system comprising:
   data process apparatus programmed to perform operations comprising:
      capturing, using a light sensor, a two or more images of a subject including a view of an eye of the subject while changing a focus distance of the light sensor at different times and according to a pattern such that a plurality of the images have different respective focus distances;
      detecting a respective degree of focus for each of a plurality of the images;
      calculating a first metric based on a determination of whether the detected respective degrees of focus correspond to the pattern;
      calculating, for each of two or more landmarks, a respective distance of the landmark to the sensor based on respective degrees of focus of the landmark in a plurality of the images;
      calculating a second metric based on a determination of whether the landmarks lie in a same plane based on the respective distances; and
      rejecting or accepting the images based on, at least, the first metric and the second metric.

15. The system of claim 14 wherein a particular focus distance is a distance from the sensor to a point in a field of view of the sensor that is in focus.

16. The system of claim 14 wherein detecting the respective degree of focus of the image comprises measuring an extent that a landmark in the image is blurred.

17. The system of claim 16 wherein measuring the extent that the landmark in the image is blurred comprises identifying a quantity of high frequency components of the image in a vicinity of the landmark.

18. The system of claim 14 wherein the landmark is one of an iris, an eye corner, a nose, and an ear.

19. The system of claim 14 comprising changing a white balance or an exposure time of the light sensor at different times during the capturing and according to a second pattern such that a plurality of the images have different respective white balances or different respective exposure times.

20. The system of claim 19 wherein rejecting or accepting the images based on, at least, the first metric comprises:
   detecting a respective white balance or a respective exposure time for each of a plurality of the images;
   calculating a second metric based on a determination of whether the detected respective white balances or respective exposure times correspond to the second pattern; and
   rejecting or accepting the images based on the first metric and the second metric.

21. The system of claim 14 wherein rejecting or accepting the images based on, at least, the first metric comprises:
   providing the first metric and one or more second metrics to a trained function approximator that was trained using training images and the first and second metrics as applied to the training images; and
   rejecting or accepting the images based on an output of the function approximator.

22. The system of claim 21 wherein a particular second metric is based on one of: a measure of deviation of detected movement of the eye from expected movement of the eye as the eye appears in a plurality of the images, and changes in glare or specular reflection patterns on a surface of the eye as the eye appears in a plurality of the images.

23. The system of claim 22 wherein the detected movement of the eye is a measure of saccadic motion.

24. The system of claim 22 wherein the detected movement of the eye is a measure of onset, duration, or acceleration of gaze transition.

25. The system of claim 14 comprising changing illumination of the subject at different times during the capturing and according to a second pattern such that a plurality of the images have different respective illuminations.

26. The system of claim 25 wherein rejecting or accepting the images based on, at least, the first metric comprises:
   detecting a respective illumination changes for each of a plurality of the images;
   calculating a second metric based on a determination of whether the detected illumination changes correspond to the second pattern; and
   rejecting or accepting the images based on the first metric and the second metric.

27. A computer program stored on a non-transitory computer-readable storage medium that, when executed by data processing apparatus, causes the data processing apparatus to perform operations comprising:
   capturing, using a light sensor, a two or more images of a subject including a view of an eye of the subject while changing a focus distance of the light sensor at different times and according to a pattern such that a plurality of the images have different respective focus distances;
   detecting a respective degree of focus for each of a plurality of the images;
   calculating a first metric based on a determination of whether the detected respective degrees of focus correspond to the pattern;
   calculating, for each of two or more landmarks, a respective distance of the landmark to the sensor based on respective degrees of focus of the landmark in a plurality of the images;
   calculating a second metric based on a determination of whether the landmarks lie in a same plane based on the respective distances; and
   rejecting or accepting the images based on, at least, the first metric and the second metric.

28. The system of claim 27 wherein a particular focus distance is a distance from the sensor to a point in a field of view of the sensor that is in focus.

* * * * *